United States Patent [19]
Shelton et al.

[11] Patent Number: 5,954,798
[45] Date of Patent: Sep. 21, 1999

[54] MECHANISM FOR DEPENDABLY MANAGING WEB SYNCHRONIZATION AND TRACKING OPERATIONS AMONG MULTIPLE BROWSERS

[75] Inventors: James A. Shelton, Holmdel; Michael I. Ingrassia, Jr., Edison; Thomas M. Rowland, Fair Haven, all of N.J.

[73] Assignee: NCR Corporation, Dayton, Ohio

[21] Appl. No.: 08/944,125

[22] Filed: Oct. 6, 1997

[51] Int. Cl.$^6$ .............................. G06F 13/00; G06F 13/14
[52] U.S. Cl. ..................... 709/224; 709/223; 709/227; 709/248
[58] Field of Search ................... 364/474.16; 379/34; 600/301; 706/10; 395/200.33, 200.48, 200.49, 200.57; 709/224, 223, 227, 248

[56] References Cited

U.S. PATENT DOCUMENTS

| | | | |
|---|---|---|---|
| 5,260,878 | 11/1993 | Luppy ................................. | 364/474.16 |
| 5,535,256 | 7/1996 | Maloney et al. ........................ | 379/34 |
| 5,544,649 | 8/1996 | David et al. .......................... | 600/301 |
| 5,715,453 | 2/1998 | Stewart ............................... | 707/104 |
| 5,727,129 | 3/1998 | Barrett et al. ........................ | 706/10 |
| 5,734,835 | 3/1998 | Selker ................................. | 709/249 |
| 5,737,619 | 4/1998 | Judson ................................. | 707/500 |
| 5,742,768 | 4/1998 | Gennaro et al. ....................... | 395/200.33 |
| 5,774,660 | 6/1998 | Brendel et al. ........................ | 704/201 |
| 5,774,664 | 6/1998 | Hidary et al. ....................... | 395/200.48 |
| 5,774,670 | 6/1998 | Montulli .............................. | 709/227 |
| 5,784,058 | 7/1998 | LaStrange et al. ..................... | 345/340 |
| 5,793,972 | 8/1998 | Shane ................................ | 395/200.49 |
| 5,796,952 | 8/1998 | Davis et al. ........................... | 709/224 |
| 5,802,299 | 9/1998 | Logan et al. .......................... | 709/218 |
| 5,809,250 | 9/1998 | Kisor ................................. | 395/200.57 |
| 5,862,330 | 1/1999 | Anupam et al. ........................ | 709/204 |
| 5,887,143 | 3/1999 | Saito et al. ........................... | 709/248 |

*Primary Examiner*—Krisna Lim
*Attorney, Agent, or Firm*—Ying Tuo; Kenneth M. Berner

[57] ABSTRACT

Described is a mechanism for dependably managing web synchronization and tracking operations among multiple consumer browsers. A session is created for each of one of the consumer browsers when an individual consumer downloads an initial web page from an HTTP server. A unique ID is assigned to that session. After the session has been created for an individual browser, the information about all activities from that consumer browser will be recorded into the session. Such a mechanism overcomes the difficulty to organize and manage the activities from the multiple consumer browsers that are stateless in nature. An administration browser can select any one of the sessions created, display the activities previously performed in that session, and conduct bi-direction synchronization with the consumer browser associated with the selected session.

29 Claims, 22 Drawing Sheets

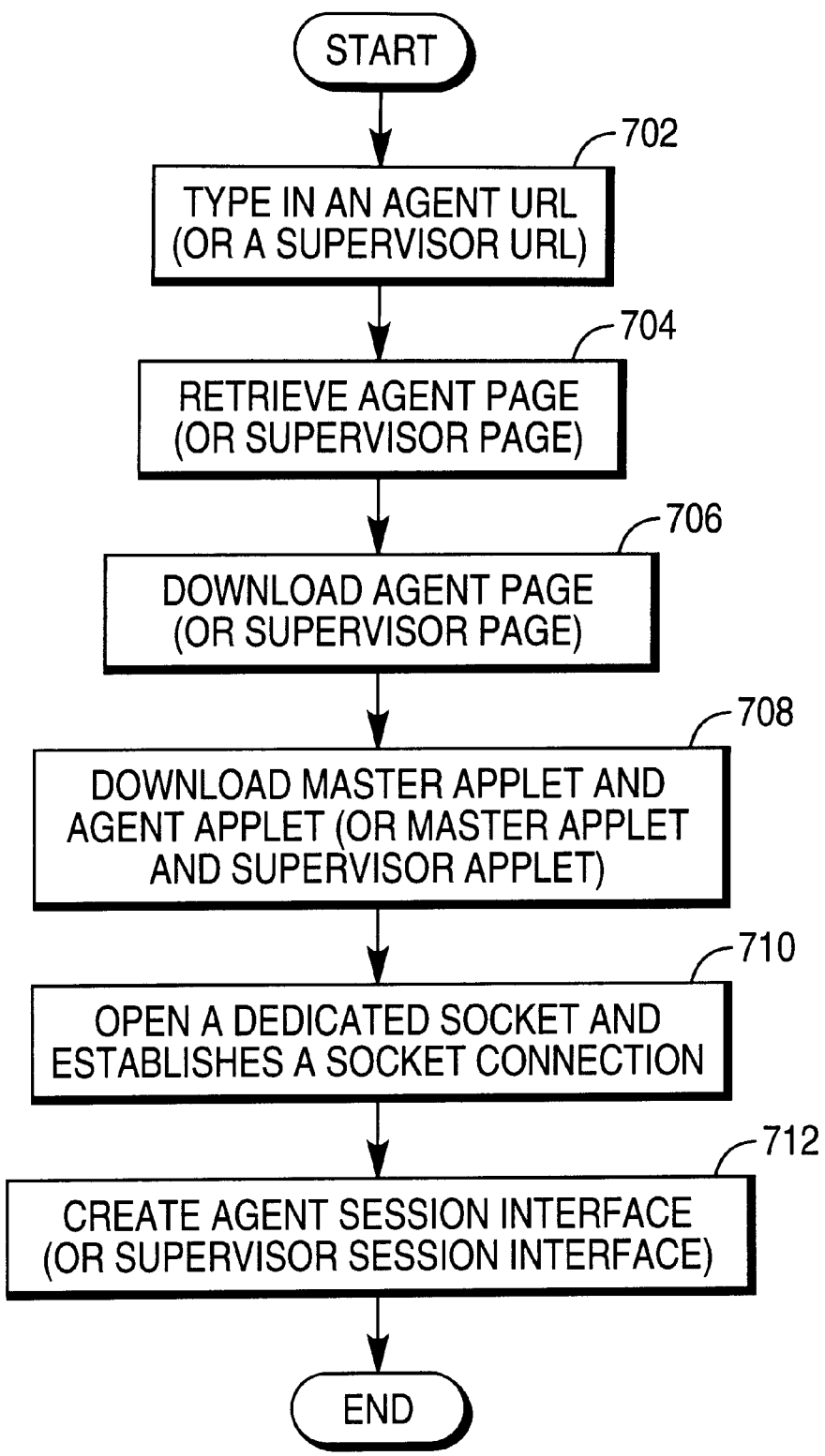

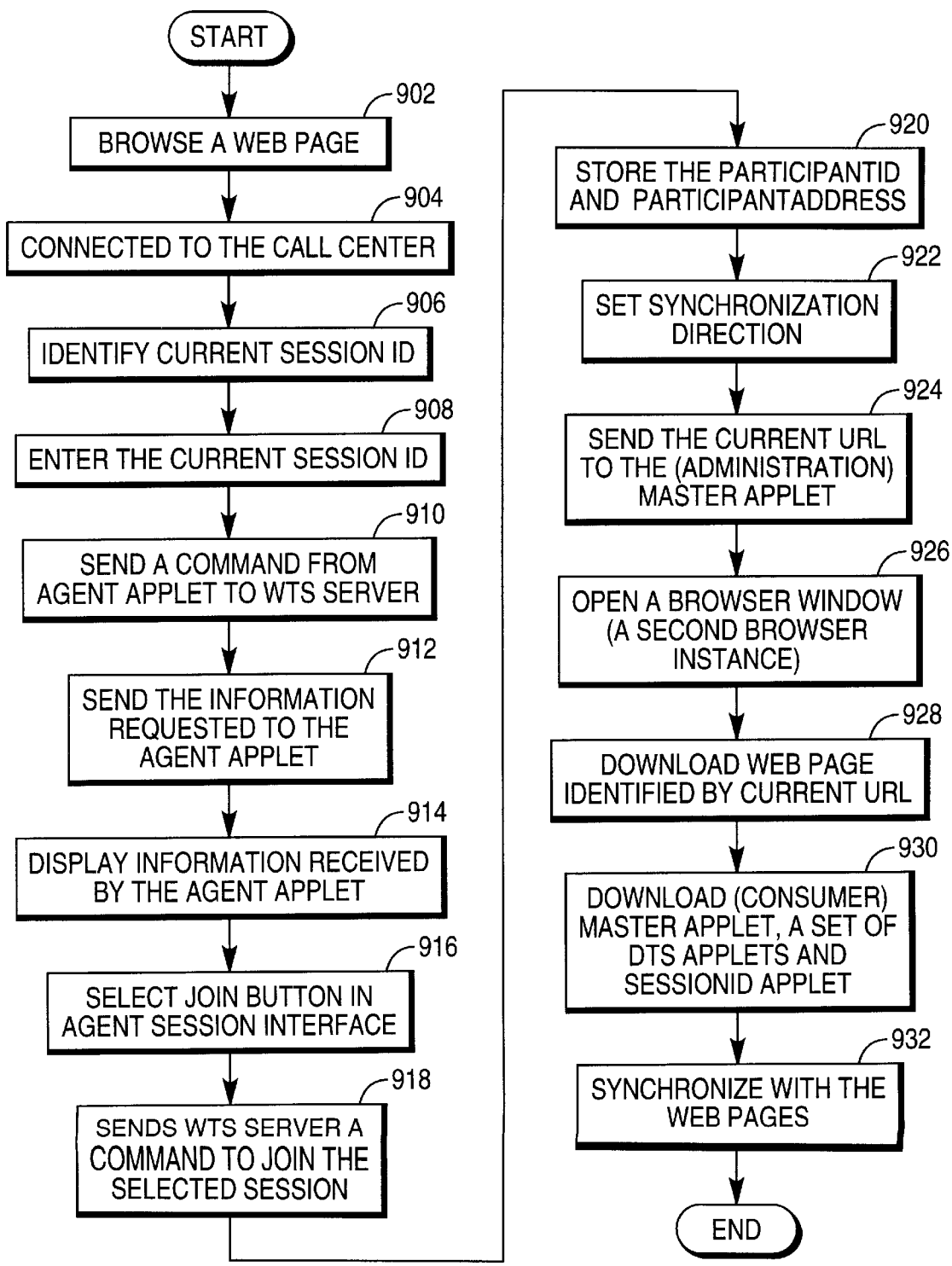

FIG. 12A

TELEPHONE BILL

Name — Susan King — 1202
Time Period — 07/01/95 - 08/01/95 — 1204
Account Balance — $100.00 — 1206
Payment — — 1208
Comments — — 1210
SessionID — 1234567 — 1212
Call Center Number — 1-800-456-7777 — 1214

1200

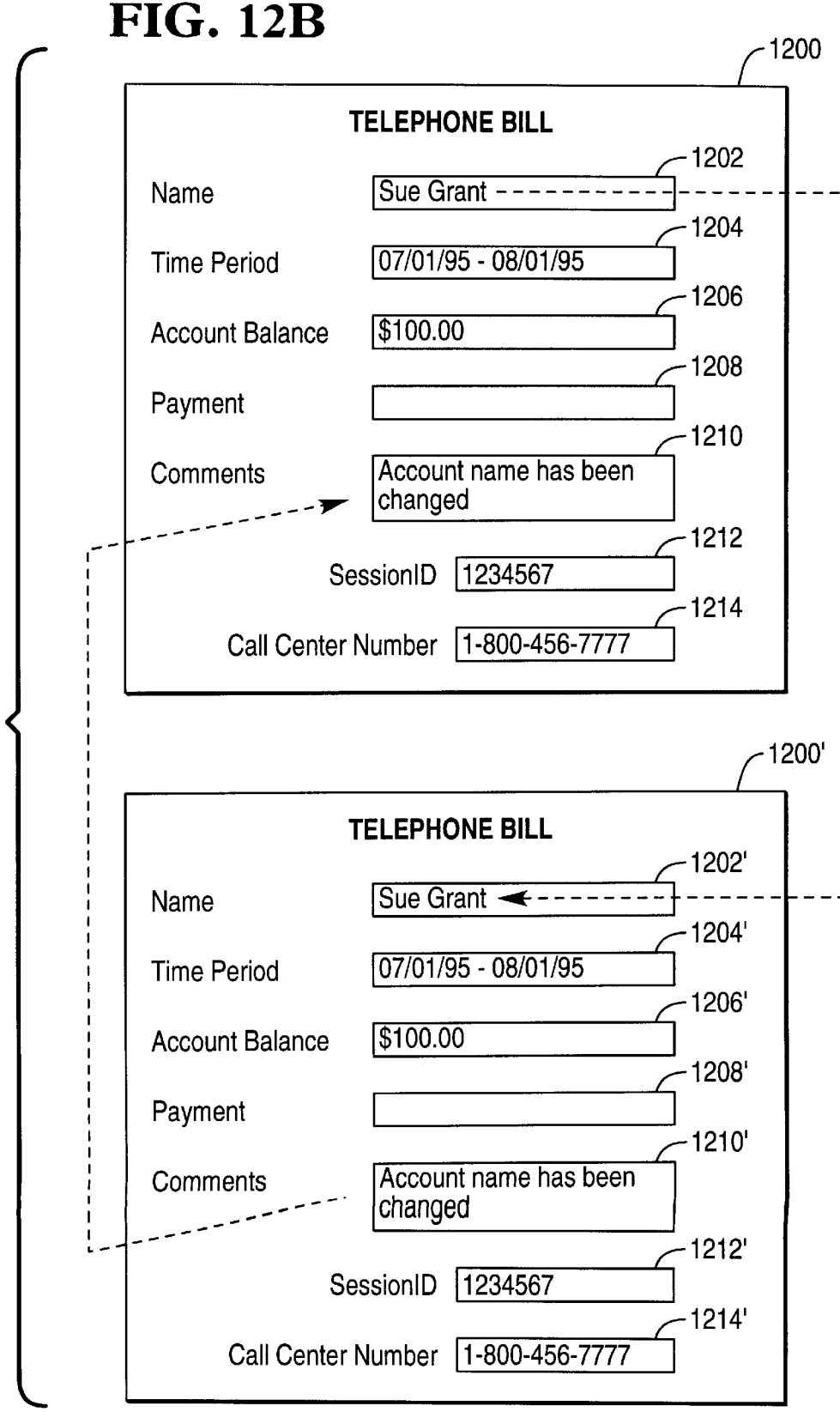

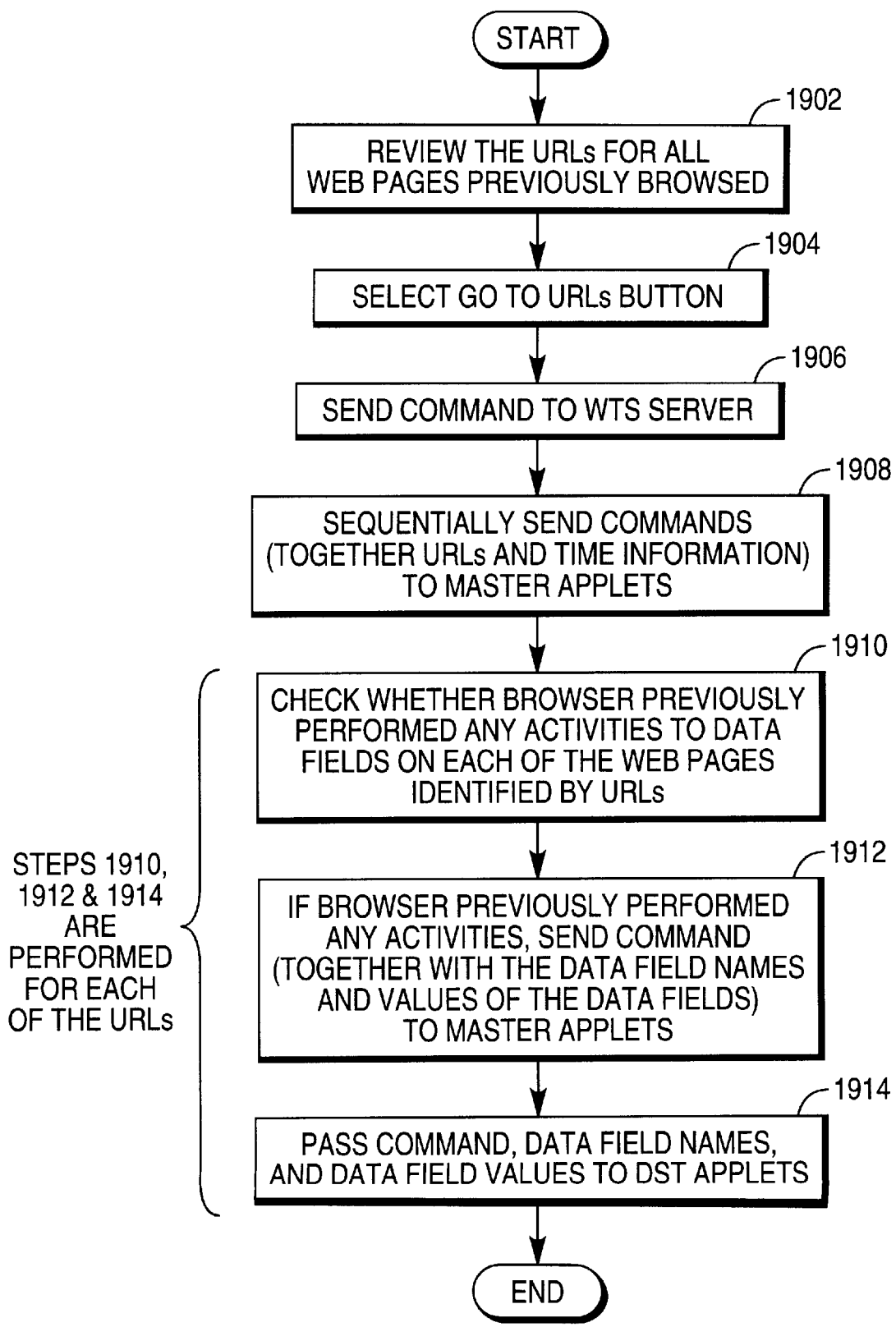

MECHANISM FOR DEPENDABLY MANAGING WEB SYNCHRONIZATION AND TRACKING OPERATIONS AMONG MULTIPLE BROWSERS

RELATED APPLICATIONS

This application relates to five other applications: (1) U.S. Ser. No. 08/944,757 filed Oct. 6, 1997, entitled "DEPENDABLE DATA ELEMENT SYNCHRONIZATION MECHANISM"; (2) U.S. Ser. No. 08/944,951 filed Oct. 6, 1997, entitled "DEPENDABLE DATA ELEMENT TRACKING MECHANISM"; (3) U.S. Ser. No. 08/944,759 filed Oct. 6, 1997, entitled "DEPENDABLE WEB PAGE TRACKING SYSTEM"; (4) U.S. Ser. No. 08/944,121 filed Oct. 6, 1997, entitled "DEPENDABLE WEB PAGE SYNCHRONIZATION MECHANISM"; and (5) U.S. Ser. No. 08/944,124 filed Oct. 6, 1997, entitled "MECHANISM FOR DEPENDABLY ORGANIZING AND MANAGING INFORMATION FOR WEB SYNCHRONIZATION AND TRACKING AMONG MULTIPLE BROWSERS".

BACKGROUND OF THE INVENTION

The present invention relates generally to a method and system for coordinating access to Internet web sites by a group of web browsers that are being run at a group of user terminals.

It is known that users can retrieve information from web sites (network sites) via the Internet. The basic model for retrieving information from web sites is user initiated information searching. Specifically, a user interacts with (via a terminal) a web browser to send a request to a web site. In response to the request, the web server for the web site retrieves the information requested and sends the web browser the information arranged in so called web page (HTML) format. One of the unique features of this model is the feature of "hyper-text links" embedded in web pages that have been retrieved. This feature enables a user searching for information to "navigate" from one web page to another.

In order to provide services (or assistance) to users (or consumers) via the Internet, it is desirable to provide features to: (1) synchronize web pages that are being browsed among a group of web browsers, (2) track activities performed to the web pages, and (3) synchronize activities performed to data elements on a web page that is being displayed at a group of user terminals, and (4) track activities performed to data elements on a web page that is being displayed at a group of user terminals. As such, it is also desirable to provide a mechanism for dependably managing web synchronization and tracking operations among multiple browsers.

One difficulty in designing such a mechanism is that individual browsers do not report all the activities performed to a web server. For example, when a browser loads web pages from its browser cache space or from a proxy server, it does not send requests to any web servers. This increases the difficulty to synchronize and track the activities from an individual browser.

Another difficulty in designing such a mechanism is to design application programs portable to different web browsers. Application programs designed for one web browser are typically not portable to another web browser manufactured by another vendor because browser interface mechanisms are proprietary.

Still another difficulty in designing such a mechanism is that individual browsers send their requests to web servers in a stateless manner. To a web server, a preceding request has no relation with a subsequent request. In processing requests, a web site has no control over the sequences of the requests.

Therefore, there is a need for an improved method to dependably manage web synchronization and tracking operations.

There is another need for an improved method to dependably manage information synchronization and tracking operations without requiring knowledge of the details about the web navigation software.

There is yet another need for an improved method to design applications for dependably managing web synchronization and tracking operations that are portable to different software environments.

The present invention meets these needs.

SUMMARY OF THE INVENTION

In one aspect, the invention provides a method for managing activities performed to pages at a plurality of user browsers and for managing page synchronization between an administrative browser and any one of the user browsers, the pages being retrieved from a network site. The method comprises the steps of:

(a) at each of the user browsers, retrieving pages;

(b) at each of the user browsers, performing activities to said pages retrieved;

(c) at the network site, recording said activities for each of the user browsers;

(d) at the administrative browser, selecting one of the user browsers; and (e) at the administrative browser, displaying activities recorded for said selected one user browser.

In another aspect, the invention provides a method for managing activities performed to pages at a plurality of user browsers and for managing page synchronization between an administrative browser and any one of the user browsers. The method comprises the steps of:

(a) at each of the user browsers, retrieving pages;

(b) at the network site, creating a plurality of sessions, with each of said sessions being associated with a respective one of the user browsers;

(c) at each of the user browsers, performing activities to said pages retrieved;

(d) at the network site, recording said activities for each of the user browsers into an associated session; and (e) at the administrative browser, displaying all sessions created for the user browsers.

The present invention also provides corresponding apparatus or system for the respective aspects mentioned above.

BRIEF DESCRIPTION OF THE DRAWINGS

The purpose and advantages of the present invention will be apparent to those skilled in the art from the following detailed description in conjunction with the appended drawing, in which:

FIG. 7 shows how an agent (or supervisor) can create a session interface by downloading an agent page (or a supervisor page) from administration page repository 149, in accordance with the present invention.

FIG. 9 shows a flowchart illustrating the operation of joining a session by an agent, in accordance with the present invention;

FIG. 12A shows a web page containing five data fields, in accordance with the present invention.

FIG. 12B shows a web page that is similar to that of FIG. 12A, except that the data in one of the five data fields is changed, in accordance with the present invention;

FIG. 19 shows a flowchart illustrating the operation of re-browsing all web pages previously viewed in a session, in accordance with the present invention.

DETAILED DESCRIPTION OF THE PREFERRED EMBODIMENTS

The following description is presented to enable any person skilled in the art to make and use the invention, and is provided in the context of a particular application and its requirements. Various modifications to the preferred embodiment(s) will be readily apparent to those skilled in the art, and the principles defined herein may be applied to other embodiments and applications without departing from the spirit and scope of the invention. Thus, the present invention is not intended to be limited to the embodiment(s) shown, but is to be accorded with the broadest scope consistent with the principles and features disclosed herein.

Figure 1:
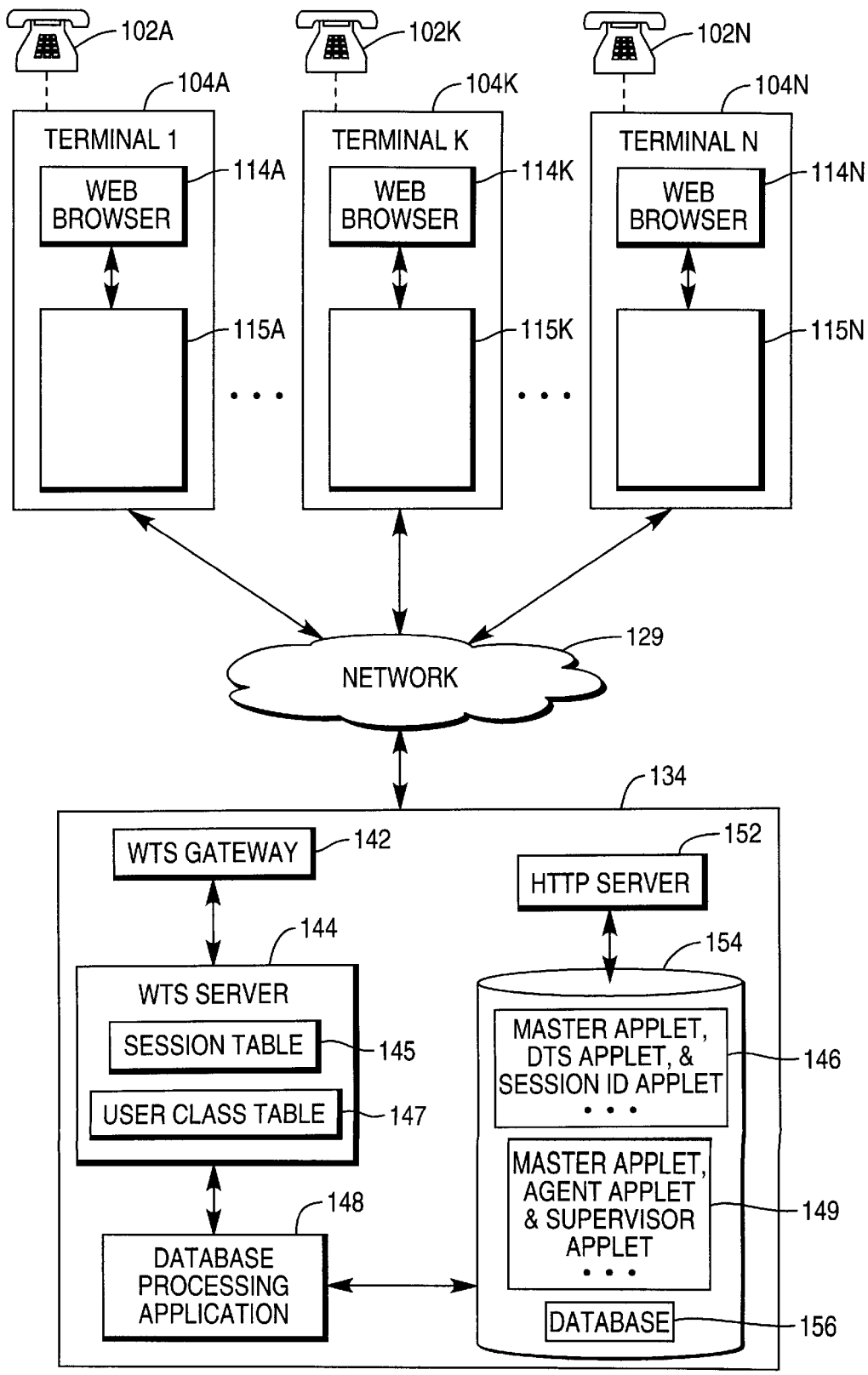
FIG. 1 shows a system includes N terminals, a network, and a web site, in accordance with the present invention.

Referring to FIG. 1, there is shown an exemplary web page synchronization system 100, in accordance with the present invention.

As shown in FIG. 1, the system includes N terminals (104A, . . . , 104K, . . . , and 104N), a network 129 (the Internet, or a combination of the Internet and an Intranet), and a web site 134. Each of the terminals has a telephone set (102A, . . . , 102K, . . . , or 102N) installed in its vicinity. Each of the terminals can be a PC computer, a workstation, a Java station, or even a web TV system.

Web site 134 includes a WTS (Web Tracking and Synching) gateway 142, a WTS server 144 containing a session table 145 and a user class table 147, a database processing application 148, an HTTP (Hyper Text Transfer Protocol) server 152, and a hard disk unit 154 for storing consumer page repository 146, administration page repository 149, and database 156. All the components in web site 134 can be installed in one or more computer systems. Each of the computer systems includes a processing unit (which may include a plurality of processors), a memory device, and a disk unit (which may include a plurality of disk sets).

Each of the terminals (104A, . . . , 104K, . . . , or 104N) includes a processor unit (not shown) and a memory area (115A, . . . , 115K, . . . , 115N), and runs a Java enabled web browser (114A, . . . , 114K, . . . , or 114N). Each of the memory area (115A, . . . , 115K, . . . , or 115N) is maintained by its respective browser (114A, . . . , 114K, . . . , or 114N). Via network 129, each of the browsers (114A, . . . 114K, . . . , or 114N) is able to send requests to and receive web pages from HTTP server 152, and to display the web pages received at its respective terminal. Each of the browsers (114A, . . . , 114K, . . . , or 114N) is able to run a Master Applet (124A, . . . , 124K, . . . , or 124N), a set of DTS (Data Tracking and Synching) Applets, a SessionID Applet, and an Agent Applet. As shown in FIG. 1, these Applets are stored in consumer page repository 146 and can be downloaded from consumer page repository 146 and stored in the memory areas of the terminals (104A, . . . , 104K, . . . , 104N).

Figure 2:
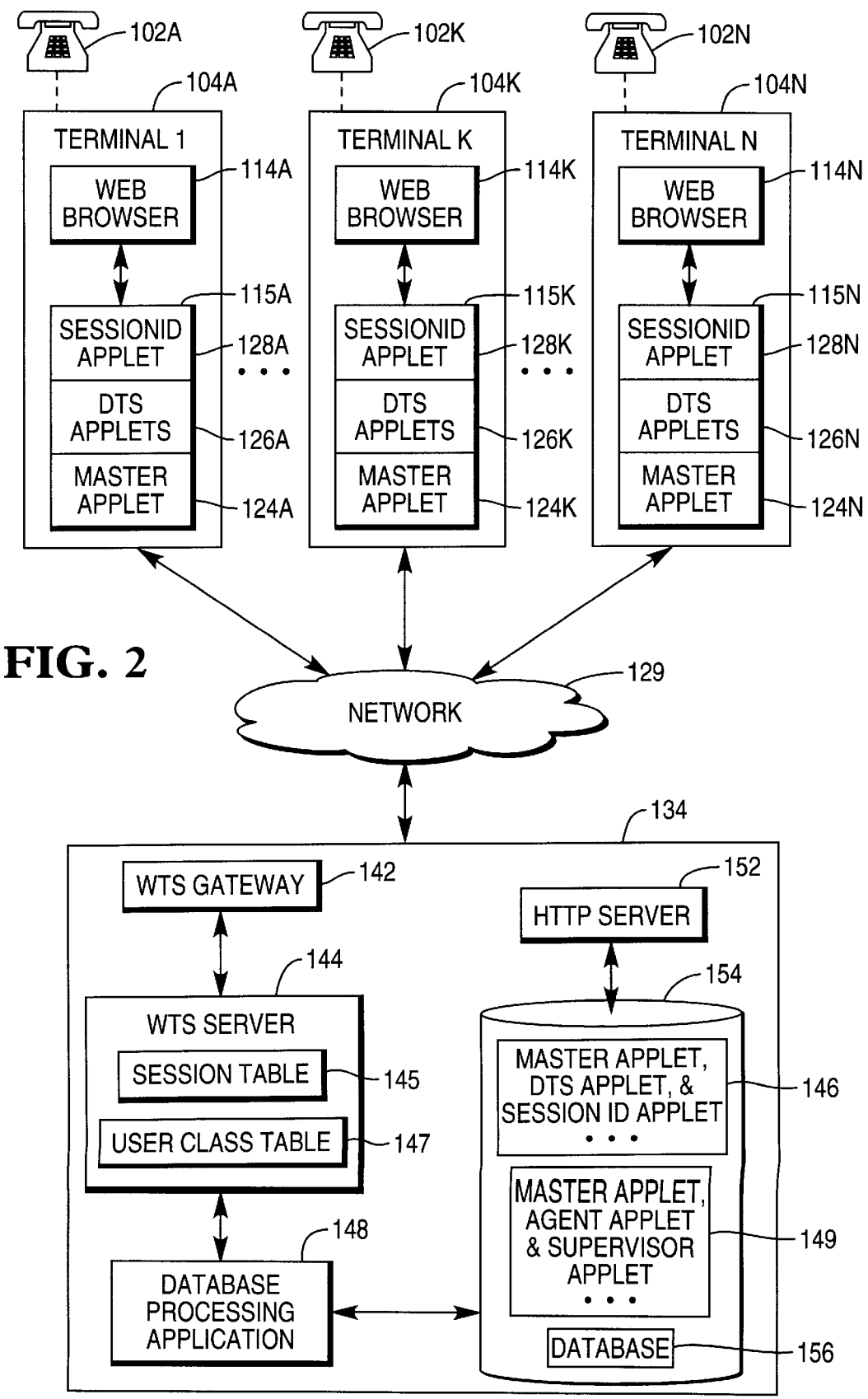
FIG. 2 shows a situation where each of the N terminals has downloaded its respective Master Applets, DTS Applets, and SessionID Applet, in accordance with the present invention.

Referring to FIG. 2, there is shown the situation where each of the terminals (104A, . . . , 104K, . . . , or 104N) has downloaded its respective Master Applets (124A, . . . , 124K, . . . , or 124N), DTS Applets (126A, . . . , 126K, . . . , or 128N), and SessionID Applet (128A, . . . , 128K, . . . , 128N), in accordance with the present invention.

In FIG. 2, each of the (consumer) Master Applet (124A, . . . , 124K, . . . , or 124N) is primarily responsible for: (1) in response to loading each web page at its respective browser, opening a dedicated socket, and establishing a socket connection to WTS gateway 142 via network 129 for its respective browser (114A, . . . , 114K, . . . , 114N), (2) communicating with WTS server 144 via the socket connection, from which WTS server 144 is able identify the origin (i.e. which browser, which web page, etc.) of the commands and information that are being delivered through, (3) monitoring the activities of its respective browser, (4) sending the information about its respective browser's activities to WTS server 144, (5) receiving and processing the information about other browsers' activities, (6) via the socket connection, providing a single communication path to WTS server 144 for DTS Applets (126A, ..., 126K, ..., or 126N), SessionID Applets (128A, ..., 128K, ..., or 128N), or any other consumer Applets embedded on the same page with the Master Applet, (7) sending commands to WTS server 144 to request services, for itself and for DTS Applets (126A, ..., 126K, ..., or 126N), SessionID Applets (128A, ..., 128K, ..., or 128N), or any other consumer Applets embedded on the same page with the Master Applet, and (8) sending user class information together with the commands, to indicate that its respective browser is a consumer user.

Each set of DTS Applets (126A, ..., 126K, ..., or 126N) contains one or more individual DTS Applets, which are primarily responsible for: (1) displaying and monitoring the data activities (data inputs or data updates of data fields) on web pages that are being displayed by its respective browser, (2) sending the data activities to WTS server 144 via its respective Master Applet, (3) receiving the data activities from other browsers via its respective Master Applet, and (4) processing the data activities from other browsers for the web pages that are being displayed by its respective browser.

Each of the SessionID Applets (128A, ..., 128K, ..., or 128N) is responsible for retrieving, and for displaying on a web page the current SessionID.

As shown in administration page repository 149, Agent Applet (or Supervisor Applet) is responsible for creating a session interface, joining, monitoring, and controlling a session through the session interface. The (administration) Master Applet is primarily responsible for: (1) opening a dedicated socket, and establishing a socket connection to WTS gateway 142 via network 129 for the session interface created by Agent Applet, Supervisor Applet, or any other administration Applets embedded on the same web page with the Master Applet, (2) communicating with WTS server 144 via the socket connection, from which WTS server 144 is able identify the origin (i.e. from which session interface) of the commands and information that are being delivered through, (3) via the socket connection, providing a single communication path to WTS server 144 for Agent Applet, Supervisor Applet, or any other administration Applets embedded on the same web page with the Master Applet, and (4) sending user class information together with the commands, to indicate that its respective browser is an administration user.

WTS gateway 142 is responsible for maintaining all socket connections between Master Applets and WTS server 144. The connections between Master Applets and WTS gateway 142 take place using standard sockets. The connection between WTS gateway 142 and WTS server 144 takes place using RMI (Remote Method Invocation).

WTS server 144 is responsible for: (1) managing and tracking the activities of all browsers participating in active sessions, exemplary activities including: loading of, interacting with, and unloading of web pages, (2) recording the information about the activities, (3) managing the synchronization of the activities for all browsers participating in the active sessions, (4) creating a session when a consumer user (via a browser) sends a request to web site 134 for the first time, (5) defining the session length intervals, (6) purging sessions that have been inactive for more than the specified session length intervals, (7) adding and deleting participants to a session, and (8) providing services to all commands from consumer Applets, such as: (consumer) Master Applet, DTS Applets, SessionID Applets, and administration Applets, such as: (administration) Master Applet, Agent Applets, and Supervisor Applet.

Consumer page repository 146 stores the web pages and Applets for consumers. Consumer Applets can be selectively embedded into consumer web pages. Exemplary consumer Applets include: (consumer) Master Applet, DTS Applets, SessionID Applet, etc.

Administration page repository 149 stores the web pages and Applets for call center administration users, including: administrator, supervisor, agent, etc. Administration Applets can be selectively embedded into administration web pages. Exemplary administration Applets include: (administration) Master Applet, Agent Applet, Supervisor Applet, etc.

To better describe the present invention, the Applets stored in (or downloaded from) repository 146 can be referred to as consumer Applets, and the Applets stored in (or downloaded from) repository 149 can be referred to as administration Applets. For example, the Master Applet stored in (or downloaded from) repository 146 can be referred to as consumer Master Applet, and the Master Applet stored in (or downloaded from) repository 149 can be referred to as administration Master Applets. HTTP server 152 contains a security application that allows consumer users to get access only to the web pages stored in consumer page repository 146, and allows administration users (such as administrator, supervisor, agent, etc.) to get access to the web pages stored in both consumer page repository 146 and administration page repository 149.

Session table 145 is responsible for maintaining the information for all active sessions.

Class table 147 is responsible for keeping records of user classes assigned to different users. Listed are exemplary user classes: administrator, supervisor, agent, and consumer.

Based on user classes (administrator, supervisor, agent, and consumer), WTS server 144 provides the following services:

(1) creating a session (consumer);

(2) storing data received from a session participant (supervisor, agent, and consumer);

(3) listing active sessions (administrator and supervisor);

(4) listing the information associated with active sessions (administrator, and supervisor);

(5) listing current users (administrator);

(6) joining a session (supervisor and agent);

(7) terminating a session (supervisor);

(8) monitoring a session (supervisor and agent);

(9) configuring a session parameters (administrator); and

(10) sending commands and information to a consumer Master Applet or an administration Master Applet in a participating browser (supervisor, agent, and consumer).

Database 156 is responsible for storing data collected in session table 145.

HTTP server 152 is responsible for processing the requests issued by one of the web browsers, retrieving the web pages from either consumer page repository 146 or administration page repository 149, and sending the web pages to the browsers that have generated these requests.

Database processing application 148 is responsible for writing the data collected in session table 145 into database 156.

Figure 3:
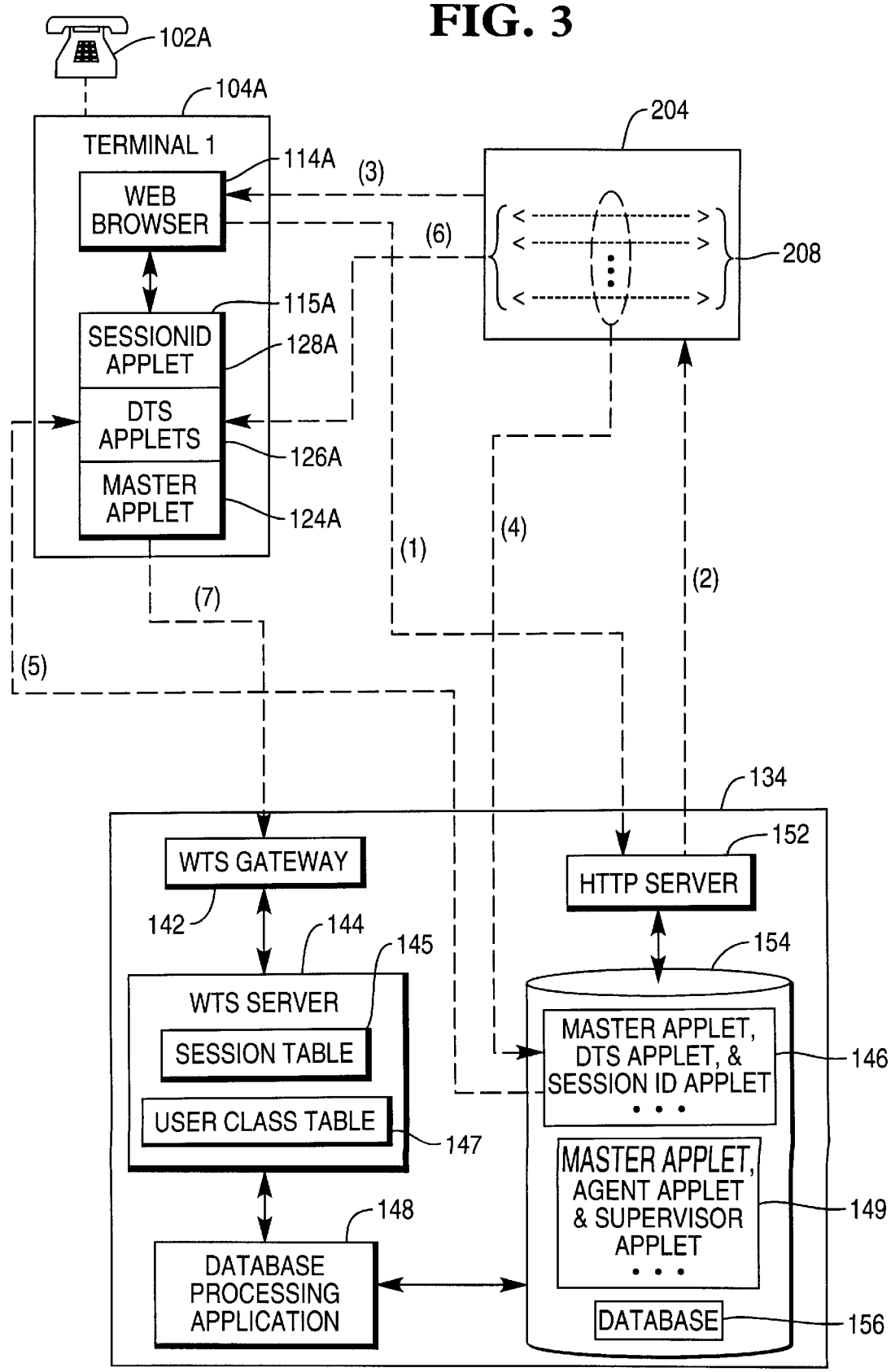
FIG. 3 shows the process the (consumer) Master Applet, DTS Applets, and SessionID Applet being downloaded into a terminal, in accordance with the present invention.

Referring to FIG. 3, there is shown the process of how the (consumer) Master Applet, DTS Applets, and SessionID Applet are downloaded into terminal 104A from HTTP server 152 in response to loading an initial web page, and then are invoked to perform the operations in accordance with the present invention.

As shown in FIG. 3, a (consumer) Master Applet, a set of DTS Applets, and a SessionID Applet are embedded into web page 204 by using a set of applet tags 208. Web page 204 is associated with a specific URL indicating the location of web page 204 in HTTP server 152.

As indicated by dotted line (1), web browser 114A sends a request including the URL of web page 204 to HTTP server 152 via network 129. As indicated by dotted line (2), in response to the request, HTTP server 152 retrieves web page 204 from consumer page repository 146 and sends it to web browser 114A via network 129. Web page 204 contains a set of applet tags 208, which indicate the location of Master Applet, DTS Applets, and SessionID Applet in HTTP server 152. As indicated by dotted line (3), web browser 114A loads web page 204. As indicated by dotted line (4), since Master Applet, DTS Applets, and SessionID Applet have not been downloaded, web browser 114A sends requests via network 129, to download these Applets based on applet tags 208. As indicated by dotted line (5), HTTP server 152 sends Master Applet, DTS Applets, and SessionID Applet to browser 114A via network 129. As indicated by dotted line (6), browser 114A stores Master Applet 124A, DTS Applets 126A, and SessionID Applet 128A into memory area 115A of terminal 104A, and initializes and invokes these Applets. After being invoked, these Applets are running together with web browser 114A, to monitor and process the activities for which they are assigned to be responsible. As indicated by line (7), Master Applet 124A opens a dedicated socket and establishes a socket connection to WTS gateway 142 for browser 114A and web page 204. Via the socket connection, Master Applet 126 sends WTS server 144 a command, together with an ID unique to browser 114A. In response to the command from Master Applet 126, WTS server 144 creates a session for browser 114A based on the unique ID, and issues a time stamp (loading time) indicating the time at which the command was received, and stores the URL and time stamp of web page 204 into the session created for browser 114. As will be seen in the description in connection with FIG. 6 following, the URL, command, and loading time are stored in a URL history list and a command list created for the session.

Figure 4:
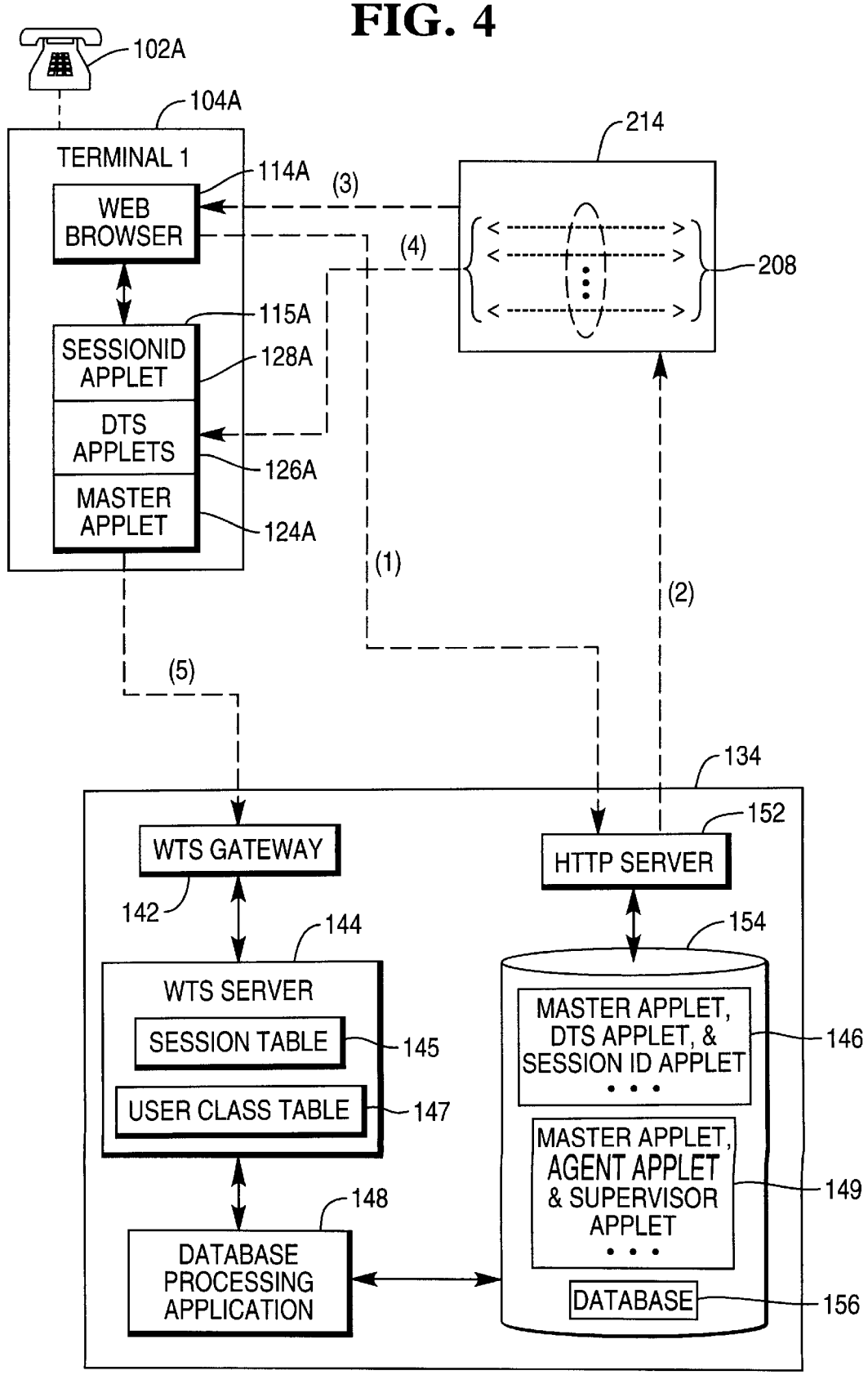
FIG. 4 shows the process the (consumer) Master Applet, DTS Applets, and SessionID Applet being invoked, in response to loading a subsequent web page, to perform the operations in accordance with the present invention, when these Applets have been previously downloaded and cached in a terminal.

Referring to FIG. 4, there is shown the process of the (consumer) Master Applet 124A, DTS Applets 126A, and SessionID Applet 128A being invoked, in response to loading a subsequent web page 214 (subsequent to web page 204), to perform the operations in accordance with the present invention, when these Applets have been previously downloaded and cached in terminal 104A.

As indicated by dotted line (1), to download web page 214, web browser 114A sends a request including the URL of web page 214 to HTTP server 152 via network 129. Before loading web page 214, the following events occur: (a) browser 114A instructs Master Applet 124A to run a stop routine, (b) via the socket connection established for browser 114A and web page 204, Master Applet 124 sends a command to inform WTS server 144 that web page 204 has been unloaded, and disconnects the socket connection established for browser 114A and web page 204, (c) WTS server 144 issues a time stamp (unloading time) indicating the time the command was received, and (d) records the URL and the time stamp of web page 204 into the session created for browser 114A. As will be seen in the description in connection with FIG. 6, following, URL, command, and unloading time are stored in a URL history list and a command list created for the session. As indicated by dotted line (2), HTTP server 152 retrieves web page 214 from consumer page repository 146 and sends it to browser 114A. Like web page 204, web page 214 contains a set of applet tags 208 for indicating the location of Master Applet 124A, DTS Applets 126A, and SessionID Applet 128A. As indicated by dotted line (3), web browser 114A loads web page 214. As indicated by dotted line (4), in response to the loading of web page 214, web browser 114A locates Master Applet 124A, DTS Applets 126A, and SessionID Applet 128A (based on the indication of applet tags 208) that are cached by browser 114A in memory area 115A, and initializes these Applets and then invokes them. As indicated by line (5), Master Applet 124A opens a dedicated socket and establishes a socket connection to WTS gateway 142 for browser 114A and web page 214. Via the socket connection established for browser 114A and web page 214, Master Applet 126A sends a command, together with the ID unique to browser 114A and the URL of web page 214, to inform WTS server 144 that web page 214 has been loaded. WTS server 144 issues a time stamp (loading time) indicating the time the command was received and stores the URL and time stamp of web page into the session created for browser 114A. As will be seen in the description in connection with FIG. 6, following, URL, command, and loading time are stored in a URL history list and a command list created for the session.

Figure 5:
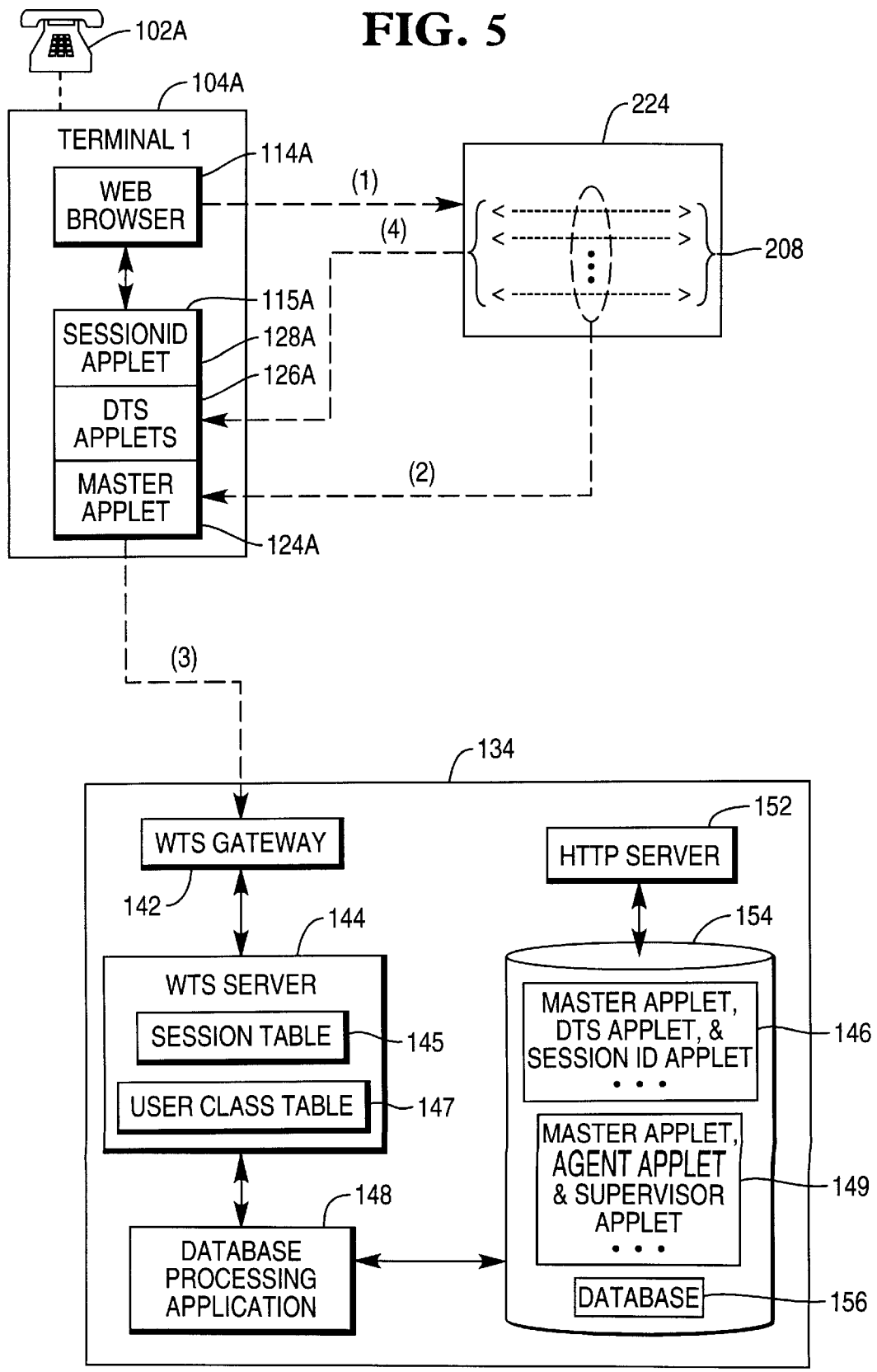
FIG. 5 shows the process of the (consumer) Master Applet, DTS Applets, and SessionID Applet being invoked, in response to loading a subsequent web page, to perform the operations in accordance with the present invention, when both these Applets and the web page have been previously downloaded and cached in a terminal.

Referring to FIG. 5, there is shown the process of the (consumer) Master Applet 124A, DTS Applets 126A, and SessionID Applet 128A being invoked, in response to loading a subsequent web page 224 (subsequent to web page 214), to perform the operations in accordance with the present invention, when both these Applets and web page 224 have been previously downloaded and cached by browser 114A in terminal 104A.

As indicated by dotted line (1), web browser 114A loads web page 224 cached in memory area 115A maintained by browser 114A. Like web pages 204 and 214, web page 224 contains a set of applet tags 208 indicating the location of Master Applet 124A, DTS Applets 126A, and SessionID Applet 128A. Before loading web page 224, the following events occur: (a) browser 114A instructs Master Applet 124A to run a stop routine, (b) via the socket connection established for browser 114A and web page 214A, Master Applet 124A sends a command to inform WTS server 144 that web page 214 has been unloaded, and disconnects the socket connection established for browser 114A and web page 214, (c) WTS server 144 issues a time stamp (unloading time) indicating the time the command was received, and (d) WTS server 144 records the URL and time stamp of web page 214 into the session created for browser 114A. As will be seen in the description in connection with FIG. 6, following, the URL, command, and unloading time are stored in a URL history list and a command list created for the session. As indicated by dotted line (2), in response to the loading of web page 224, browser 114A locates Master Applet 124A, DTS Applets 126A, SessionID Applet 128A that have been cached by browser 114A in memory area 115A in terminal 104A, and initializes and invokes these Applets. As indicated by line (3), Master Applet 124A opens a dedicated socket and establishes a socket connection to WTS gateway 142 for browser 114A and web page 224. Via the socket connection established for browser 114A and web page 224, Master Applet 126A sends a command, together with the ID unique to browser 114A and the URL of web page 224, to inform WTS server 144 that web page 224 has been loaded. WTS server 144 issues a time stamp (loading time) indicating the time the command was received and stores the URL and time stamp into the session created for browser 114. As will be seen in the description in connection with FIG. 6, following, the URL, command, and loading time are stored in a URL history list and a command list created for the session.

In the example shown in FIG. 5, it should be appreciated that even through no request arrives at HTTP server 144 when web page 224 is loaded from cached memory in terminal 104A, Master Applet 124A still sends browsing activities to WTS server 144.

It should be noted that the processes shown in FIGS. 3–5 of loading and invoking Master Applet, DTS Applets, and SessionID Applet for terminal 104A can also be used for terminals 104K, . . . , 104N.

In FIGS. 3–5, Master Applet, DTS Applets, and SessionID Applet are all embedded into web pages 204, 214, and 224. However, it should be noted that not all the Applets are required to be embedded into a web page. Depending on the desired functions to be performed, respective Applets can be selectively embedded into a web page by selectively setting applet tags in the web page. For example, if data synchronization and tracking of individual elements are not needed, the applet tags for linking DTS Applets can be eliminated from the web page. By the same token, if additional functions are needed, additional applet tags can be added into the web page to link additional Applets.

Figure 6:
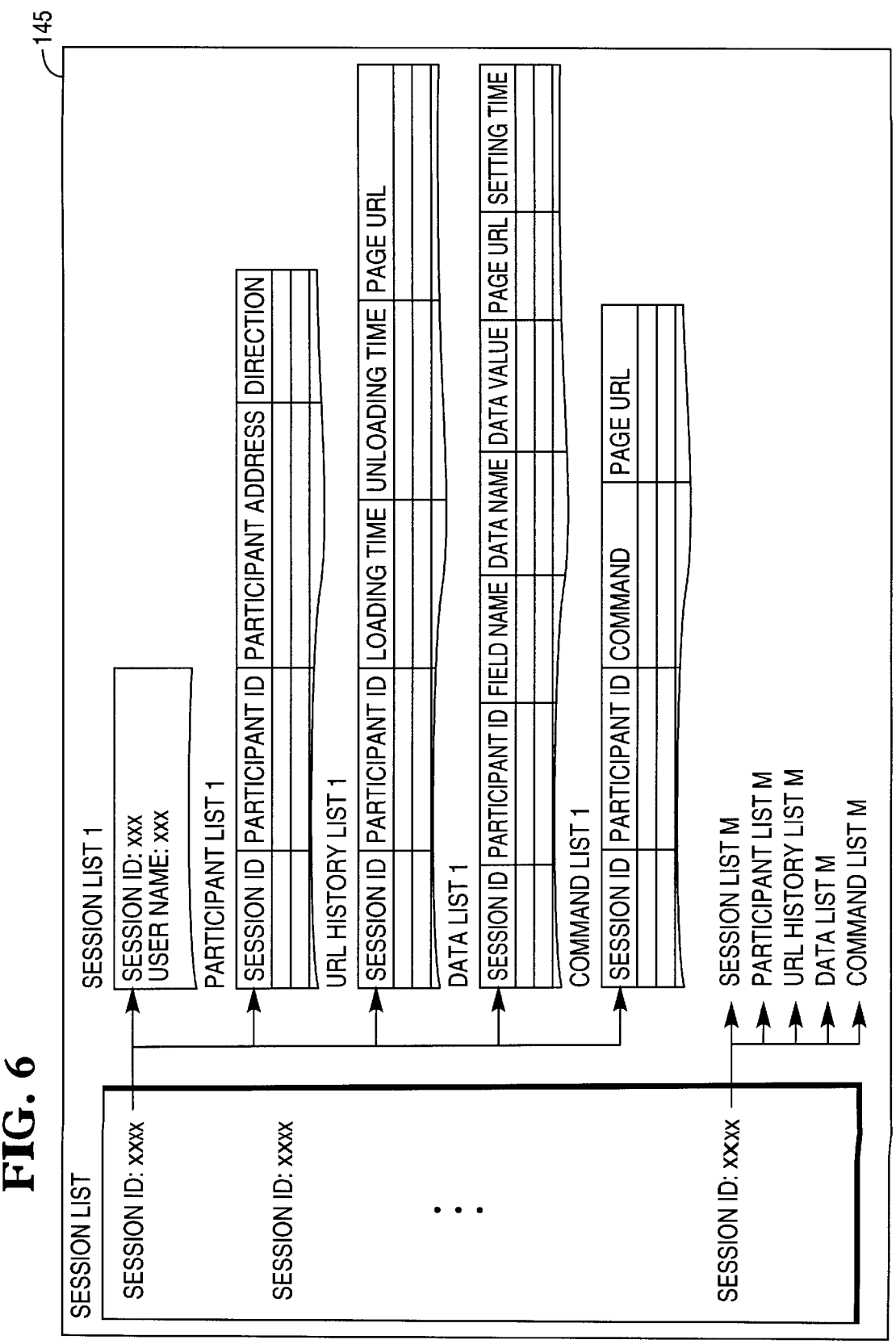
FIG. 6 shows a session table in greater detail, in accordance with the present invention.

Referring to FIG. 6, there is shown session table 145 (see FIG. 1) in greater detail, in accordance with the present invention.

While browsers at their respective terminals are browsing through the web pages in web site 134, WTS server 144 collects and analyzes the information about the interactions between all browsers and the web pages that have been downloaded to the browsers from web site 134. One difficulty in collecting and analyzing such information is that browsing individual web pages in web site 134 is a stateless process. More specifically, web site 134 receives a sequence of requests from different browsers, and sends the respective web pages to the respective browsers in response to the sequence requests. Since in processing the requests from an individual browser, web site 134 does maintain a constant connection to the same browser to keep an one-to-one relationship, web site 134 has no control over, or maintain data on, the sequences of the requests from the browsers.

To meaningfully collect and analyze the information about the interactions between the browsers and web pages, a session is defined as a collection of web page interactions that occur over a given period of time from a specific browser. A session is created when a browser first hits web site 134, and a session window (or session length interval) is defined for the session. If activities from a specific browser (identified by an ID unique to the browser, issued by a respective Master Applet) does not occur within the session window, the session is terminated and cleaned up by WTS server 144. A session window is refreshed (reset to time zero) each time the information about the associated browser is sent to WTS server 144. For example, if a session window is defined as 15 minutes, as long as the associated terminal has some activity every 15 minutes, the session will remain open. After 15 minutes of inactivity, the session is terminated and purged. A subsequent request from the same terminal will cause a new session to be created. After a session has been created for a terminal, one or more other terminals can join the session.

As shown in FIG. 6, session table 145 includes M Session IDs created for M sessions respectively. Each of the session ID is associated with: (1) a session list for maintaining information about a session, (2) a participant list for maintaining information about all participant browsers in a session (note: when a session is first created, it only contains one participant), (3) a URL history list for maintaining information about all web pages visited by all participants in a session, (4) a data list for maintaining information about the data fields on the web pages visited by all participants in a session, and (5) a command list for maintaining information about all commands issued to WTS server 144 by the various participants in a session.

Typical items in a session list are: (1) SessionID for identifying a session, (2) UserName for indicating the actual name for whom the session is created, (3) StartTime for indicating the time of starting the session, (4) StopTime for indicating the time of stopping the session, and (5) SessionNotes for recording the notes of the session.

Typical fields contained in a participant list are: (1) SessionID for linking the participant list to a session, (2) ParticipantID for identifying a participant, (3) ParticipantAddresses for indicating a participant's IP address, (4) Class for indicating the user class of the participant (customer, agent, supervisor, administrator, etc.) and (5) Direction for indicating the synchronization direction for the participant browser.

Typical fields contained in a URL history list are: (1) SessionID for linking the URL history list to a session, (2) PageURL for indicating the URL of a web page visited, (3) ParticipantID for identifying a participant who visited the web page, (4) LoadingTime for indicating the loading time of the web page, and (4) UnloadingTime for indicating the unloading time of the web page.

Typical fields contained in a data list are: (1) SessionID for linking the data list to a session, (2) WasRelayed for indicating if this data field has been broadcasted, (2) FieldName for indicating the actual name of the data field, (3) DataName for indicating the name of the data field displayed on a web page, (4) DataValue for indicating the value of the data field, (5) TimeStamp for indicating the time at which this data field is updated, (6) URL for indicating the web page on which the data field was displayed, and (7) ParticipantID for indicating the participant browser who updated this data field.

Typical fields contained in a command list are: (1) SessionID for linking the data list to a session, (2) Command for indicating the specific command executed (loading a page, unloading a page, changing a data field, etc.), (3) URL for indicating the web page to which the command operated, (4) FieldPoint for indicating the data field to which the command operated, and (5) TimeStamp for indicating the time at which command was executed.

Before a session is purged from session table 145, database processing application 147 stores the associated session list, URL history list, and command list to database 156. The data contained in these three lists can be used by data warehouse integration applications.

Referring to FIG. 7, there is shown an operation for creating a session interface for an agent (or a supervisor) by downloading an agent page (or a supervisor page) from administration page repository 149, in accordance with the present invention. In the example shown in FIG. 7, it is assumed that administration user class (either agent user class or supervisor user class) is assigned to terminal 104N, so that the security application in HTTP server 152 grants the access to the web page stored in both consumer page repository 146 and administration page repository 149.

At step 702, an agent at terminal 144N types in an agent URL at terminal 104N, and browser 114N sends the URL to HTTP server 152, to retrieve an agent page, in which an (administration) Master Applet and an Agent Applet are embedded. For a supervisor, he/she types in a supervisor URL at terminal 104N, and browser 114N sends the URL to HTTP server 152, to retrieve a supervisor page, in which an (administration) Master Applet and a Supervisor Applet are embedded.

At step 704, HTTP server 152 retrieves the agent page (or a supervisor page) from administration page repository 149 and sends it to browser 114N.

At step 706, browser 114N downloads the agent page, in which a Master Applet (administration Master Applet) and an Agent Applet are embedded; or downloads the supervisor page, in which a Master Applet (administration Master Applet) and a Supervisor Applet are embedded.

At step 708, browser 114N downloads the Master Applet and Agent Applet from HTTP server 152, initializes and invokes these Applets; or downloads the Master Applet and Supervisor Applet from HTTP server 152, and initializes and invokes these Applets.

At step 710, Master Applet opens a dedicated socket, establishes a socket connection to WTS gateway 142, and sends an ID unique to browser 114N to WTS server 144. WTS server 144 is able to identify browser 114N based on the unique ID.

Figure 8A:
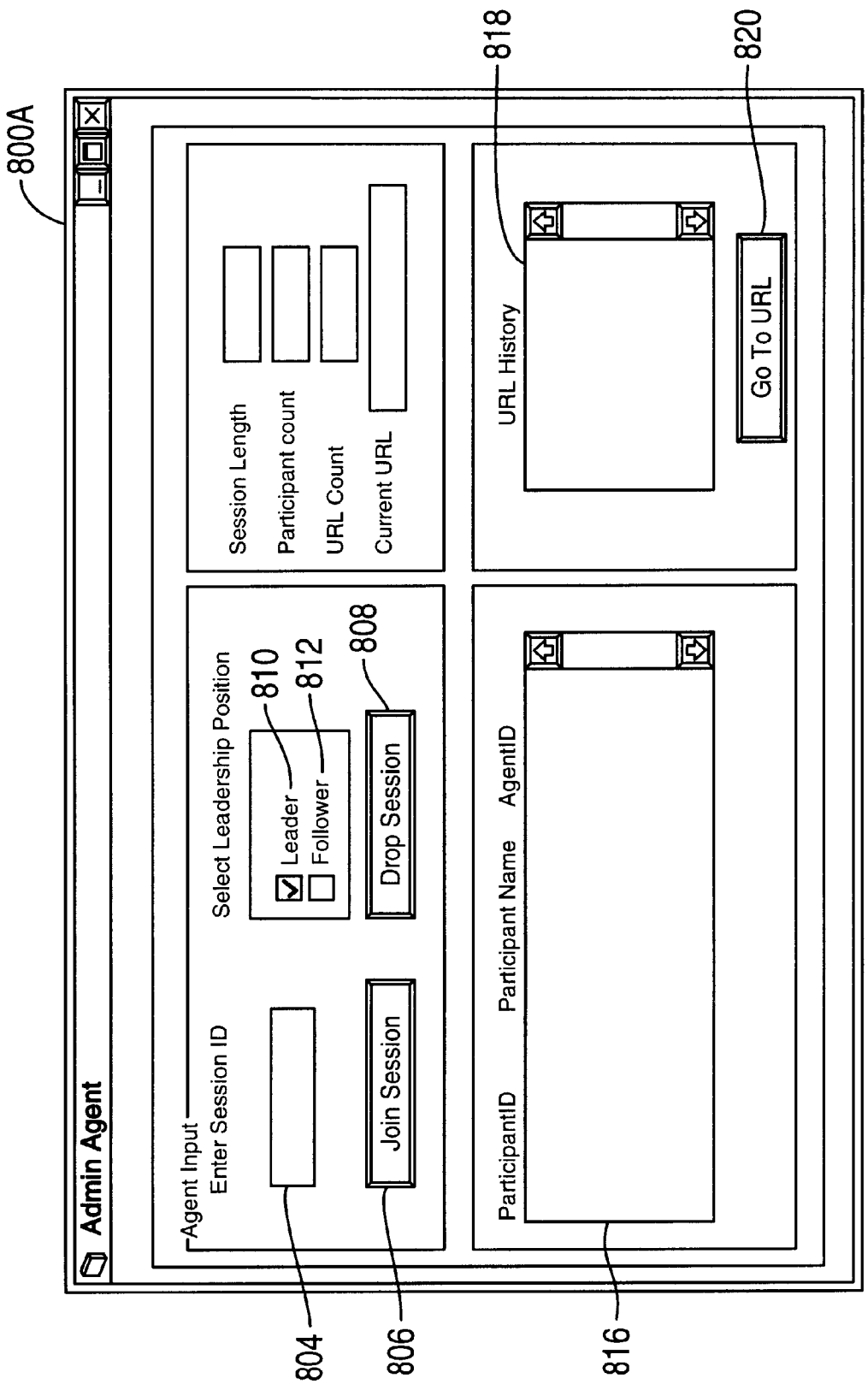
FIG. 8A shows an agent session interface, in accordance with the present invention.
Figure 8B:
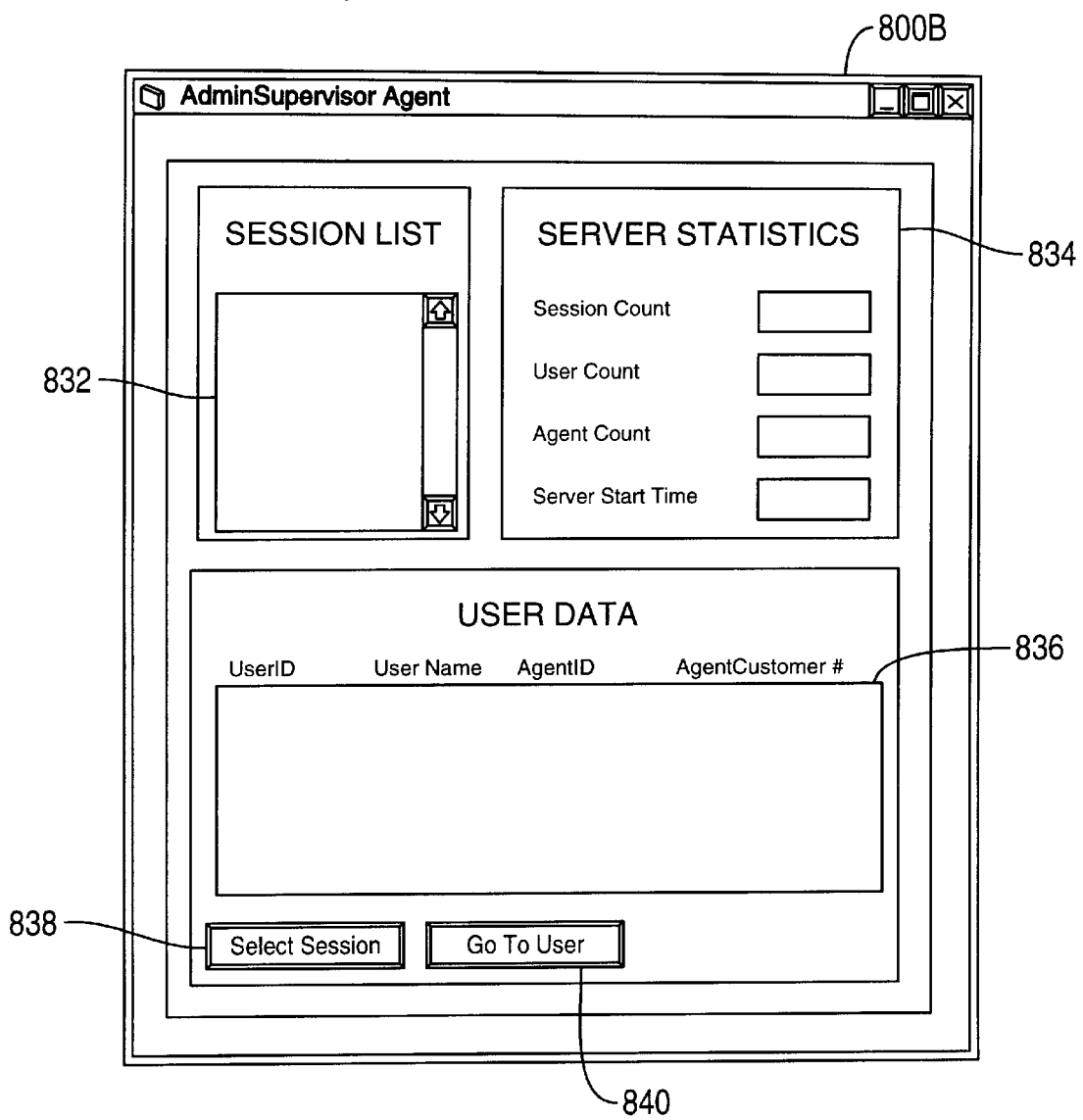
FIG. 8B shows a browser supervisor session interface, in accordance with the current invention.

At step 712, Agent Applet creates an agent session interface 800A shown in FIG. 8A for the agent user; or Supervisor Applet creates a supervisor session interface 800B shown in FIG. 8B for the supervisor agent.

Referring to FIG. 8A, there is shown an agent session interface 800A created for an agent at step 712, in accordance with the present invention.

As shown in FIG. 8A, the session interface contains a text box 804 for entering a session ID, a Join session button 806 for joining a session identified by the session ID, a drop button 808 for leaving a session, a leader check box 810 (selecting of which designates a browser as a leading browser in synchronization), a follower check box 812 (selecting of which designates a browser as a following browser in synchronization), a scrollable list box 816 for displaying the information contained in the participant list associated with a selected session, a scrollable list box 818 for displaying the information in an identified URL history list, and a text box 820 for displaying the information in an identified data list. If both the leader and follower check boxes 810 and 812 are selected in the agent session interface, browser 114A acts as both leading and following browser in synchronization.

Referring to FIG. 8B, there is shown a browser supervisor session interface 800B created for a supervisor at step 712, in accordance with the current invention.

As shown in FIG. 8B, the session interface contains a scrollable list box 832 for displaying session IDs of all active sessions in session table 145 and for selecting one of the session IDs, a text box 834 for displaying relevant statistics of WTS server 144, a multi column scrollable list box 836 for displaying details about the session selected in scrollable list box 832, a select session button 838 for selecting a session from scrollable list box 832. By using the information in scrollable list box 832, a supervisor agent can monitor all active sessions. By using the information in multi column scrollable list box 836, a supervisor can monitor operational status of a session selected from scrollable list box 832, including: (1) whether this session is being helped by an agent, (2) user name, and (3) agent ID. By selecting select session button 838, a supervisor can create an agent session interface as shown in FIG. 8C.

Figure 8C:
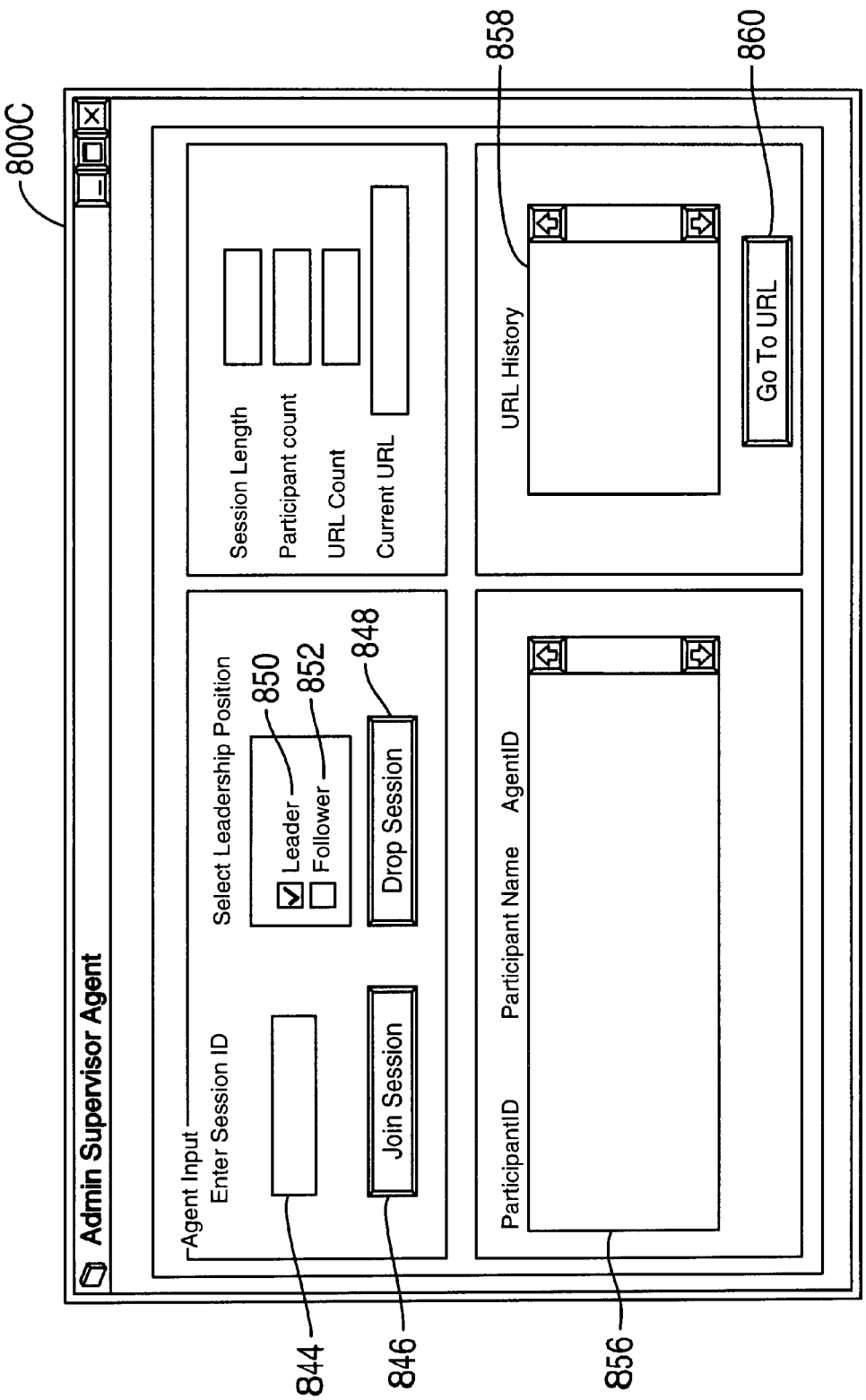
FIG. 8C shows a supervisor agent session interface, in accordance with the present invention.

Referring to FIG. 8C, there is shown a supervisor agent session interface 800C, in accordance with the present invention.

Referring to FIG. 9, there is shown a flowchart illustrating the operation of joining a session by an agent, in accordance with the present invention.

In the example shown in FIG. 9, it is assumed that: (1) a consumer at terminal 104A is browsing web pages from consumer page repository 146 via browser 114A, (2) session list 1 shown in FIG. 6 has been created for browser 114A, (3) an agent class has been assigned to browser 114N, (4) agent session interface 800A shown in FIG. 8A has been displayed on terminal 104N; (5) a (administration) Master Applet and Agent Applet have been previously downloaded into browser 114N, (6) a dedicated socket connection has been established for session interface 800A displayed at terminal 104N by the (administration) Master Applet, and (7) the agent at terminal 104A is on duty at a call center.

As shown in FIG. 9, at step 902, the consumer is browsing a web page at terminal 104A. On the web page, SessionID Applet 128A displays the current session ID. A call center telephone number the consumer can call is also displayed on the web page.

At step 904, the consumer is connected to the call center by dialing the telephone number via telephone 102A (see FIG. 1), and the call is directed by the call center to the agent.

At step 906, the consumer tells, via telephone 102A (see FIG. 1), the agent the current session ID displayed. It should be noted that, instead of using the telephone, the agent can be informed of the current session ID by alternative methods. For example, the consumer can enter his/her telephone number into a special web page that contains the caller ID of the consumer along with the current session ID. This information can be stored into a special lookup table that can be used by the agent to lookup the current session ID.

At step 908, at terminal 104N, the agent types the current session ID into text box 804 (see FIG. 8A).

At step 910, in response to a loss of focus or a pressing of the Enter key, through the socket connection established for agent session interface 800A displayed on terminal 104N, the (administration) Master Applet at terminal 104N sends a command to WTS server 144, to retrieve the information in participant list 1, URL history list 1, and data list 1 (see FIG. 6) for the Agent Applet.

At step 912, WTS server 144 sends the information requested to the Agent Applet (via the Master Applet).

At step 914, the Agent Applet at terminal 104N displays some information from participant list 1 and URL history list 1 in (participant) scrollable list box 816 and (URL history) scrollable list box 818, respectively.

At step 916, the agent selects join button 806 in agent session interface 800A displayed on terminal 104N.

At step 918, in response to the selection at step 916, through the socket connection which has been established for agent session interface displayed on terminal 104N, the (administration) Master Applet sends WTS server 144 a command to join the selected session. Based on the identification associated with the socket connection, WTS server is able to generate a ParticipantID for browser 114N and to find the ParticipantAddress for terminal 104N.

At step 920, WTS server 144 stores the ParticipantID and ParticipantAddress into participant list 1. At this step, participant list 1 includes two participant records (two rows) containing the PaticipantIDs for browsers 114A and 114N respectively.

At step 922, at terminal 104N, the agent selects: leading check box 810 or following check box 812, or both of them. By only selecting leader check box 810, the activities at terminal 104N are synchronized at terminal 104A, but not other way around. By only selecting follower check box 812, the activities at terminal 104A are synchronized at terminal 104N, but not other way around. By selecting both leader and follower check boxes 810 and 812, the activities at terminals 104A and 104N are synchronized with each other (bi-directional synchronization). In response to the selection(s), through the socket connection which has been established for agent session interface 800A, the (administration) Master Applet sends WTS server 144 a command designating the synchronization direction. WTS server 144 stores the synchronization direction information into the Direction fields of the two records in participation list 1. In this example, it is assumed that the bi-directional synchronization has been selected for terminals 104A and 104N.

At step 924, WTS server 144 sends the (administration) Master Applet the URL of the web page being currently browsed at terminal 104A.

Figure 10:
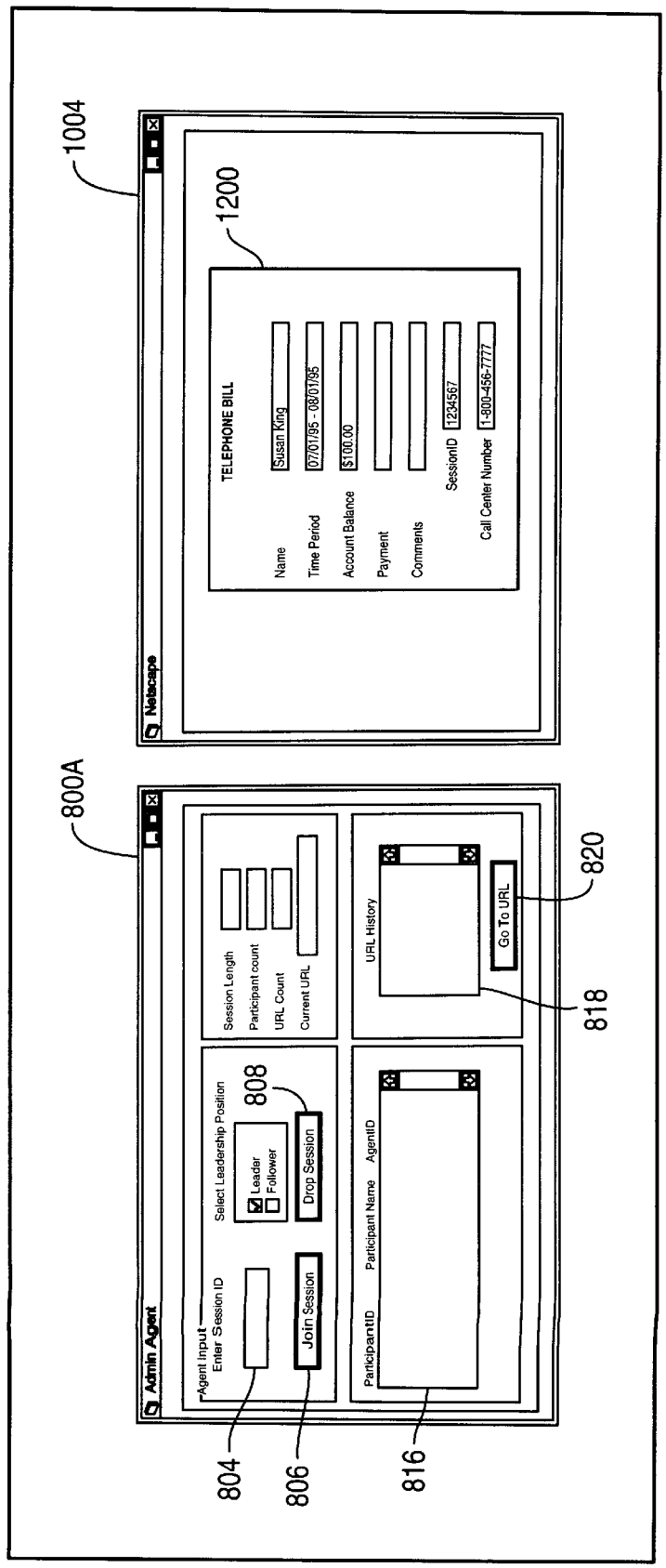
FIG. 10 shows a screen display containing two browse instances, in accordance with the present invention.

At step 926, the Agent Applet at terminal 104N opens a browser window 1004 (a second browser instance) as shown in FIG. 10.

At step 928, browser 114N downloads the web page identified by the URL from consumer page repository 146, and displays it in browser window 1004. A (consumer) Master Applet, a set of DTS Applets, and a SessionID Applet are embedded in the web page downloaded.

At step 930, browser 114N downloads (consumer) Master Applet 124N, set of DTS Applets 126N, and SessionID Applet 128N.

At step 932, the web pages displayed in second browser window 1004 at terminal 104N are being synchronized with the web pages being displayed at terminal 104A.

After step 932, if the agent (the first agent) at terminal 104A needs assistance from another agent (the second agent) at terminal 104K, the first agent can call the second agent and tell him/her the current session ID. The second agent can then join the current session using an agent session interface as shown in FIG. 8A displayed at terminal 104K.

Referring to FIG. 10, there is shown a screen display containing two browser instances (800A and 1004) at terminal 104N, in accordance with the present invention.

As shown in FIG. 10, at terminal 104N, the first browser instance provides an agent session interface 800A to control and monitor the current session, and the (administration) Master Applet for agent session interface 800A establishes and maintains a socket connection for agent session interface 800A. The second browser instance provides a browser window 1004 to display the web pages being synchronized. (Consumer) Master Applet 124N establishes and maintains a socket connection for each web page displayed in browser window 1004.

Figure 11:
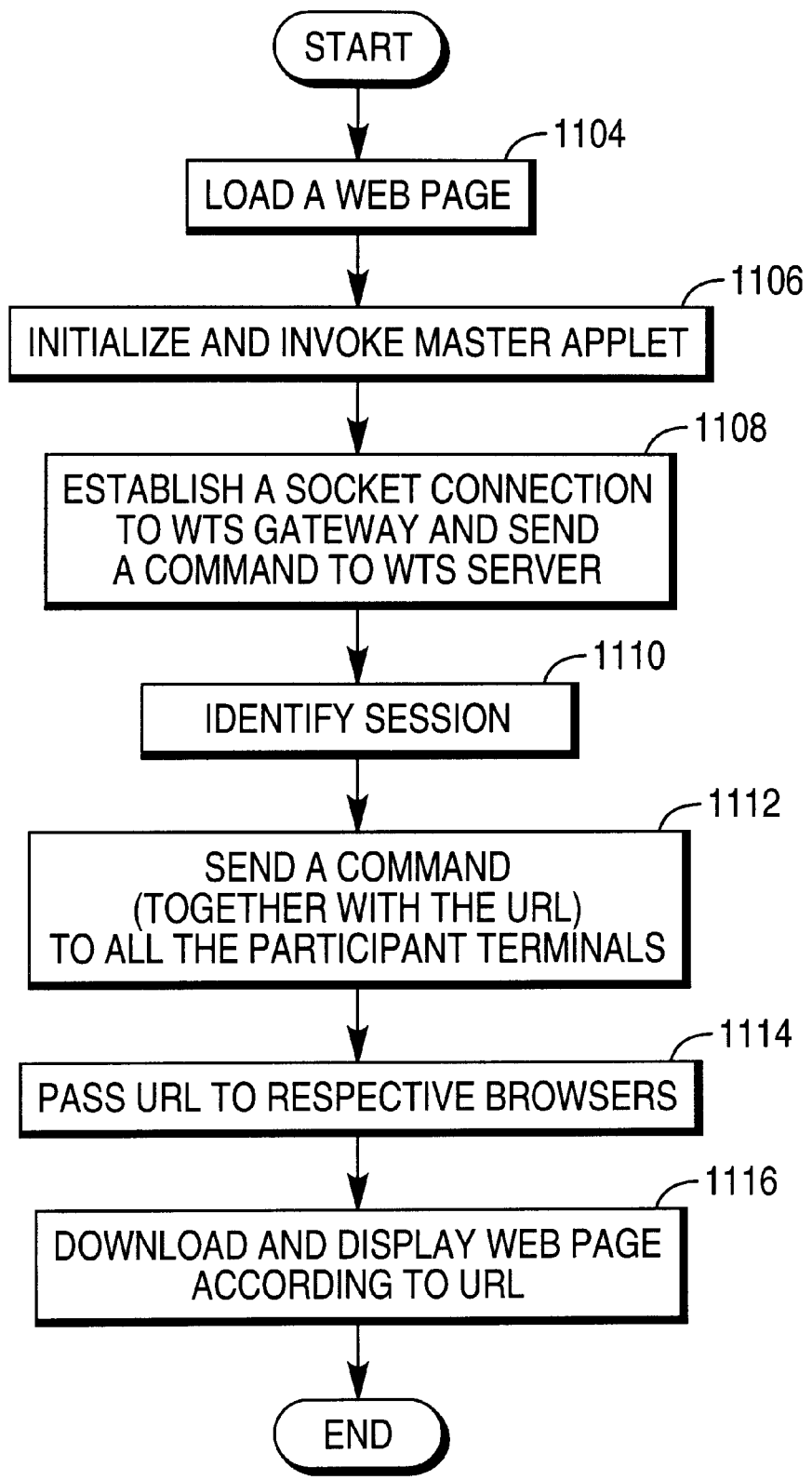
FIG. 11 shows a flowchart illustrating the operation of web page synchronization, in accordance with the present invention.

Referring to FIG. 11, there is shown a flowchart illustrating the operation of web page synchronization, in accordance with the present invention.

In the example shown in FIG. 11, it is assumed that: (1) a consumer at terminal 104A is browsing web pages from consumer page repository 146 via browser 114A, (2) a session has been created for browser 114A, (3) session list 1 and participant list 1 shown in FIG. 6 have been created for the session, (4) bi-directional synchronization has been selected for terminal 104A and all participant terminals, and (5) the (consumer) Master Applet, DTS Applets, and SessionID Applet have been downloaded into browser 104A and all participant browsers.

As shown in FIG. 11, at step 1104, browser 114A loads a web page either from consumer page repository 146 or from memory area 115A in terminal 104A. If Master Applet 124A, DTS Applets 126A, and SessionID Applet 128A had not been download to browser 114A, browser 114A would download these Applets from consumer page repository 146. However, in this example, these Applets are assumed to be downloaded.

At step 1106, in response to the loading of the web page, browser 114A initializes and invokes Master Applet 124A, DTS Applets 126A, and SessionID Applet 128A.

At step 1108, Master Applet 124A: (1) opens a dedicated socket, and establishes a socket connection to WTS gateway 142 for browser 114A and the web page loaded, and (2) via the socket connection, sends WTS server 144 a command together with an ID unique to browser 114A and the URL of the web page loaded. Based on the unique ID, WTS server is able to identify the session created for browser 114A.

At step 1110, WTS server 144 identifies the session for browser 114A.

At step 1112, WTS server 144 locates all IP addresses assigned to participant terminals in participant list 1 (shown in FIG. 6), and sends a command, together with the URL, to all the participant terminals (except that WTS server 144 does not sent the URL to terminal 104A, because the URL is originated from terminal 104A).

At step 1114, upon receiving the command, the (consumer) Master Applets in the participant terminals initialize themselves and pass the URL to their respective browsers.

At step 1116, the respective browsers in the participant terminals download and display the web page according to the URL.

It should be noted that, like terminal 104A, each of the participant terminals (at which agent session interface is displayed) can lead the page synchronization using the operation shown in FIG. 11.

Referring to FIG. 12A, there is shown a web page containing five data fields, specifically: name 1202, time period 1204, account balance 1206, payment 1208, comments 1210, a text box 1212 for displaying the current session ID, and a text box for displaying the call center number the consumer can call, in accordance with the present invention.

Referring to FIG. 12B, there is shown a web page that is similar to that of FIG. 12A, except that the data in the field of name 202 is changed from Susan King to Sue Grant and the changes are synchronized at a participant terminal, in accordance with the present invention.

Figure 13:
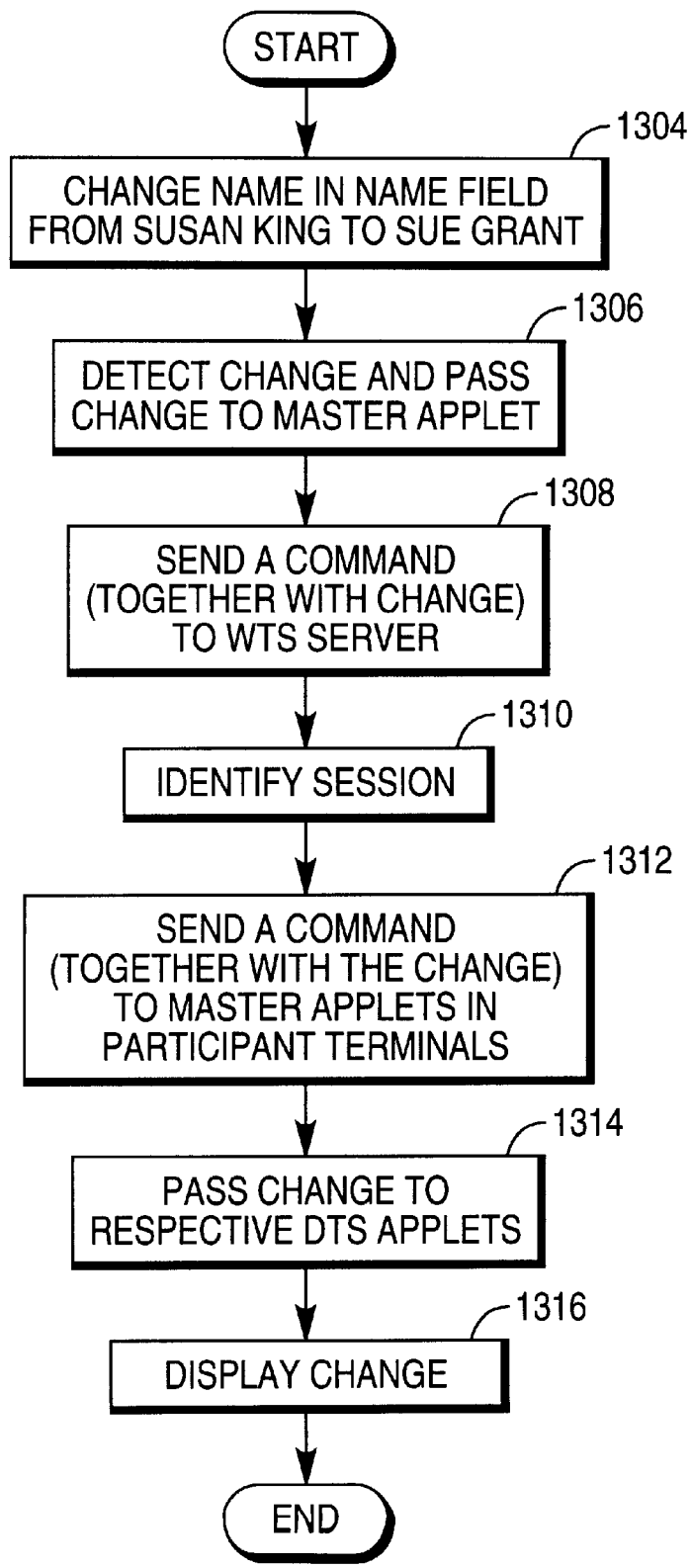
FIG. 13 shows a flowchart illustrating the operation of data synchronization, in accordance with the present invention.

Referring to FIG. 13, there is shown a flowchart illustrating the operation of data synchronization, in accordance with the present invention.

In the example shown in FIG. 13, it is assumed that: (1) a customer at terminal 104A is browsing web pages via browser 114A, (2) a session has been created for terminal 104A, (3) session list 1 and participant list 1 shown in FIG. 6 has been created for the session, (4) terminal 104N is one of the participants, (5) web page 1200 containing five data fields shown in FIG. 12A is displayed on terminals 104A and all participant terminals, (6) a bi-directional synchronization has been selected for terminal 104A and all participant terminals, (7) the (consumer) Master Applet, DTS Applets, and SessionID Applet have been downloaded to browser 114A and the browsers at all participant terminals, (8) the DTS Applets contains five individual Applets: DTS Applet$_1$, DTS Applet$_2$, DTS Applet$_3$, DTS Applet$_4$, and DTS Applet$_5$, (9) these five individual DTS Applets are respectively responsible for monitoring and processing the events occurred on the five data fields of web page 1200 shown in FIG. 12A, (10) (consumer) Master Applet 124A has established a dedicated socket connection to WTS gateway 142 for web page 12A displayed at terminal 104A, and (11) the customer at terminal 104A wants to make changes to name field 1202 from Susan King to Sue Grant.

As shown in FIG. 13, at step 1304, the customer changes the name in name field 1202 from Susan King to Sue Grant.

At step 1306, in response to a loss of focus on name field 1202 or pressing the Enter key, DTS Applet$_1$ detects the change and passes the change to Master Applet 124A.

At step 1308, via the dedicated socket connection, Master Applet 124A sends WTS server 144 a command together with the change of name field 1202. Since this change is passed to WTS server 144 via the dedicated socket connection established for web page 1200, WTS server 144 is able to recognize the origin of the command, web page 1200, and the name field upon which the change was made.

At step 1310, WTS server 144 identifies the session created for browser 114A.

At step 1312, WTS server 144 locates the IP addresses assigned to participant browsers in participant list 1 and sends a command (together with the change of name field 1202) to the Master Applets in all participant terminals (except that WTS server 144 does not send the command and change to browser 114A, since this change originated from browser 114A).

At step 1314, upon receiving the command, the (consumer) Master Applets (including Master Applets 124N) pass the change of name field 1200 to their respective DTS Applets, including the DTS Applet$_1$ at browser 114N.

At step 1316, the DTS Applet$_1$ display the update "Susan Grant" into the name fields on respective web page 1200 displayed on the respective terminals, including terminal 104N.

It should be noted that the operation shown in FIG. 13 can be used to perform data synchronization for the other four data fields on web page 1200 shown in FIG. 12A.

It should also be noted that the data field synchronization can also be performed at terminal 104N. For example, as shown in FIG. 12B, when the agent at terminal 104N enters comments of "Account's name had been changed" to comments field 1210' on web page 1200', this updates will be displayed in comments field 1210 at terminal 104A, by using the operation shown in FIG. 13.

Figure 14:
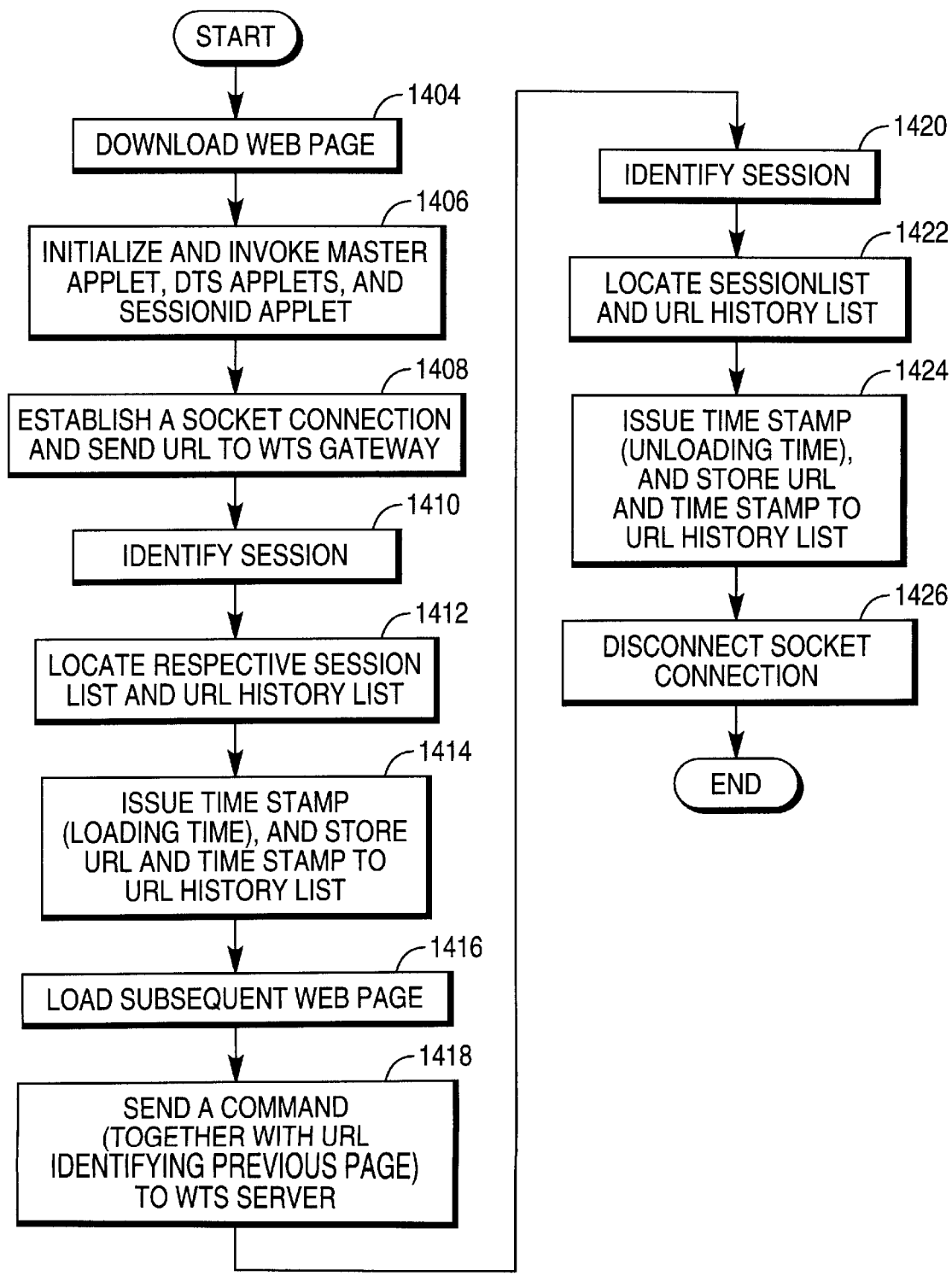
FIG. 14 shows a flowchart illustrating the operation of web page tracking, in accordance with the present invention.

Referring to FIG. 14, there is shown a flowchart illustrating the operation of web page tracking, in accordance with the present invention.

In the example shown in FIG. 14, it is assumed that: (1) a customer at terminal 104A is browsing web pages via browser 114A, (2) a session has been created for terminal 104A and all participant terminals, (3) session list 1, participant list 1, and URL history list 1 shown in FIG. 6 have been created for the session, (4) bi-directional synchronization has been selected for terminal 104A and all participant terminals, and (5) the (consumer) Master Applet, DTS Applets, and SessionID Applet have been downloaded into terminals 104A and all participant terminals.

As shown in FIG. 14, at step 1404, browser 114A downloads a web page from either the consumer page repository 146 or memory area 115A of terminal 104A. It Master Applet 124A, DTS Applets 126A, and SessionID Applet 128A had not been download to terminal 104A, browser 114A would download them from HTTP server 152. However, in this example, these Applets have been downloaded.

At step 1406, web browser 114A initializes and invokes Master Applet 124A, DTS Applets 126A, and SessionID Applet 128A.

At step 1408, Master Applet 124A opens a dedicated socket and establishes a socket connection to WTS gateway 142 for web browser 114A and the web page loaded. Master Applet 124A then sends WTS server 144 a command, together with: (1) an ID unique to browser 114A, and (2) the URL of the web page loaded. When commands and URL are delivered through this socket connection, WTS server 144 is able to recognize the origin of the commands and URL.

At step 1410, WTS server 144 identifies the session ID for browser 114A.

At step 1412, WTS server 144 locates the session list 1 and URL history list 1.

At step 1414, WTS server 144 issues a time stamp (loading time) for indicating the time at which the command was received, and stores the URL and time stamp to URL history list 1.

At step 1416, browser 114A sends WTS server 144 a request to load a subsequent web page.

At step 1418, before loading the subsequent web page, via the socket connection, Master Applet 124A sends WTS server 144 a command, together with the URL, to inform WTS server 144 that the current web page has been unloaded.

At step 1420, WTS server 144 identifies the session for terminal 104A.

At step 1422, WTS server 144 locates the session list 1 and URL history list 1.

At step 1424, WTS server 144 issues a time stamp (unloading time) for indicating the time at which the command was received, and stores the URL and time stamp to URL history list 1.

At step 1426, Master Applet 124A disconnects the socket connection for the web page that has been unloaded.

Figure 15:
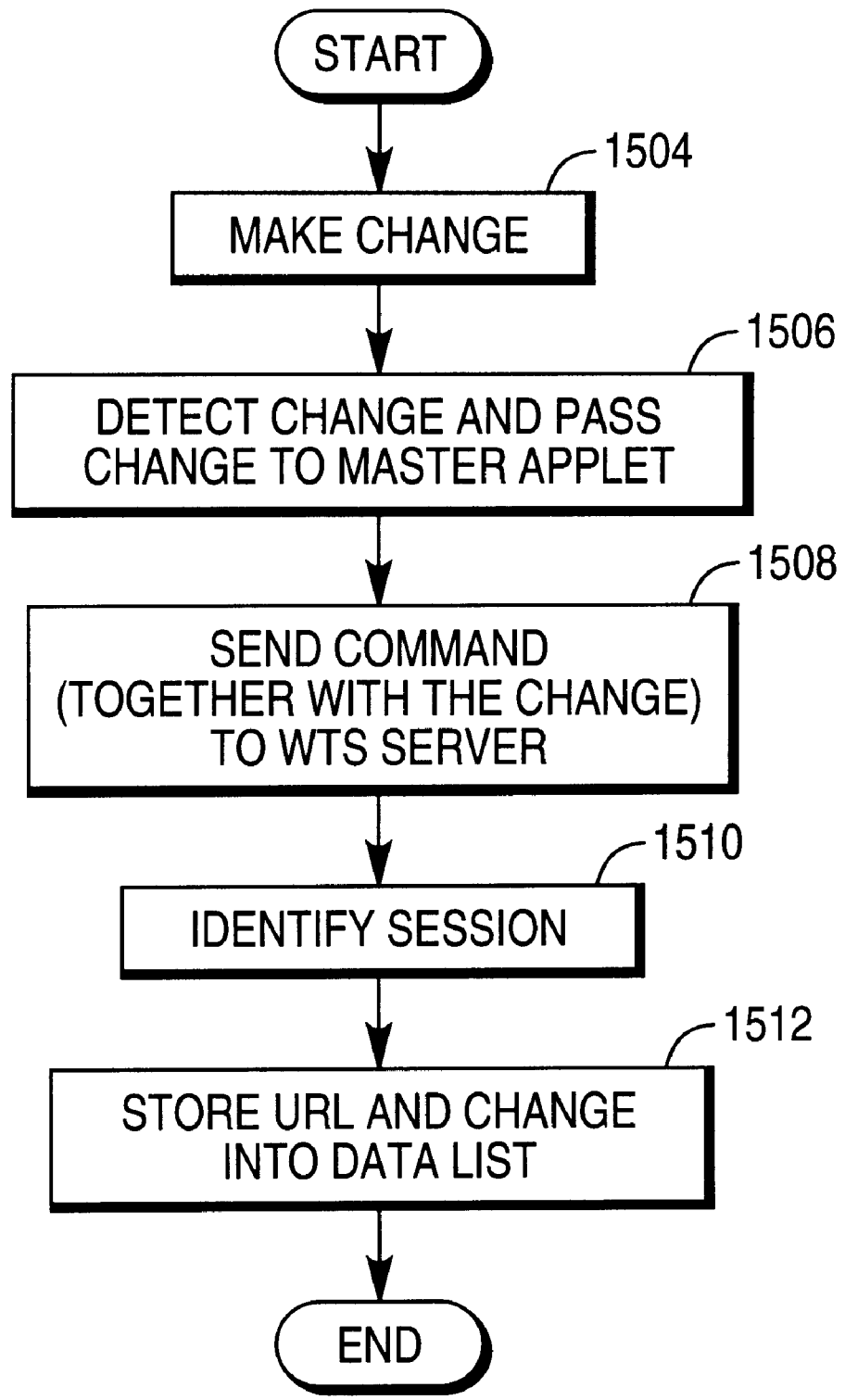
FIG. 15 shows a flowchart illustrating the operation of data tracking, in accordance with the present invention.

Referring to FIG. 15, there is shown a flowchart illustrating the operation of data tracking, in accordance with the present invention.

In the example shown in FIG. 15, it is assumed that: (1) a customer at terminal 104A is browsing web pages via browser 114A, (2) a session has been created for terminal 104A, (3) session list 1 and participant list 1 shown in FIG. 6 has been created for the session, (4) terminal 104N is one of the participants, (5) web page 1200 containing five data fields shown in FIG. 12A is displayed on terminals 104A and all participant terminals, (6) a bi-directional synchronization has been selected for terminal 104A and all participant terminals, (7) the (consumer) Master Applet, DTS Applets, and SessionID Applet are downloaded to terminal 104A and all participant terminals, (8) the DTS Applets contains five individual Applets: DTS Applet$_1$, DTS Applet$_2$, DTS Applet$_3$, DTS Applet$_4$, and DTS Applet$_5$, (9) these five individual DTS Applets are respectively responsible for displaying, monitoring and processing the events occurred on the five data fields of web page 1200 shown in FIG. 12A, (10) Master Applet 124A has established a dedicated socket connection to WTS server 144 for web page 1200 displayed on terminal 104A, and (11) the customer at terminal 104A wants to make changes to name field 1202 from Susan King to Sue Grant.

As shown in FIG. 15, at step 1504, the customer changes the name in name field 1502 from Susan King to Sue Grant.

At step 1506, in response to a loss of focus on name field 1202 or pressing the Enter key, DTS Applet$_1$, detects the change and passes the change to Master Applet 124A.

At step 1508, via the dedicated socket connection, Master Applet 124A sends WTS server 144 a command together with the change of name field 1202. Since this change is passed to WTS server 144 via the dedicated socket connection established for web page 1200, WTS server 144 is able to recognize the origin of the command, web page 1200, and the name field upon which the change was made.

At step 1510, WTS server 144 identifies the session created for terminal 104A.

At step 1512, WTS server 144 stores the URL and update of name field 1202 into data list 1.

It should be noted that the operation shown in FIG. 15 can be used to perform data tracking for the other four data fields on web page 1200, and to perform data tracking for all participant terminals.

Figure 16:
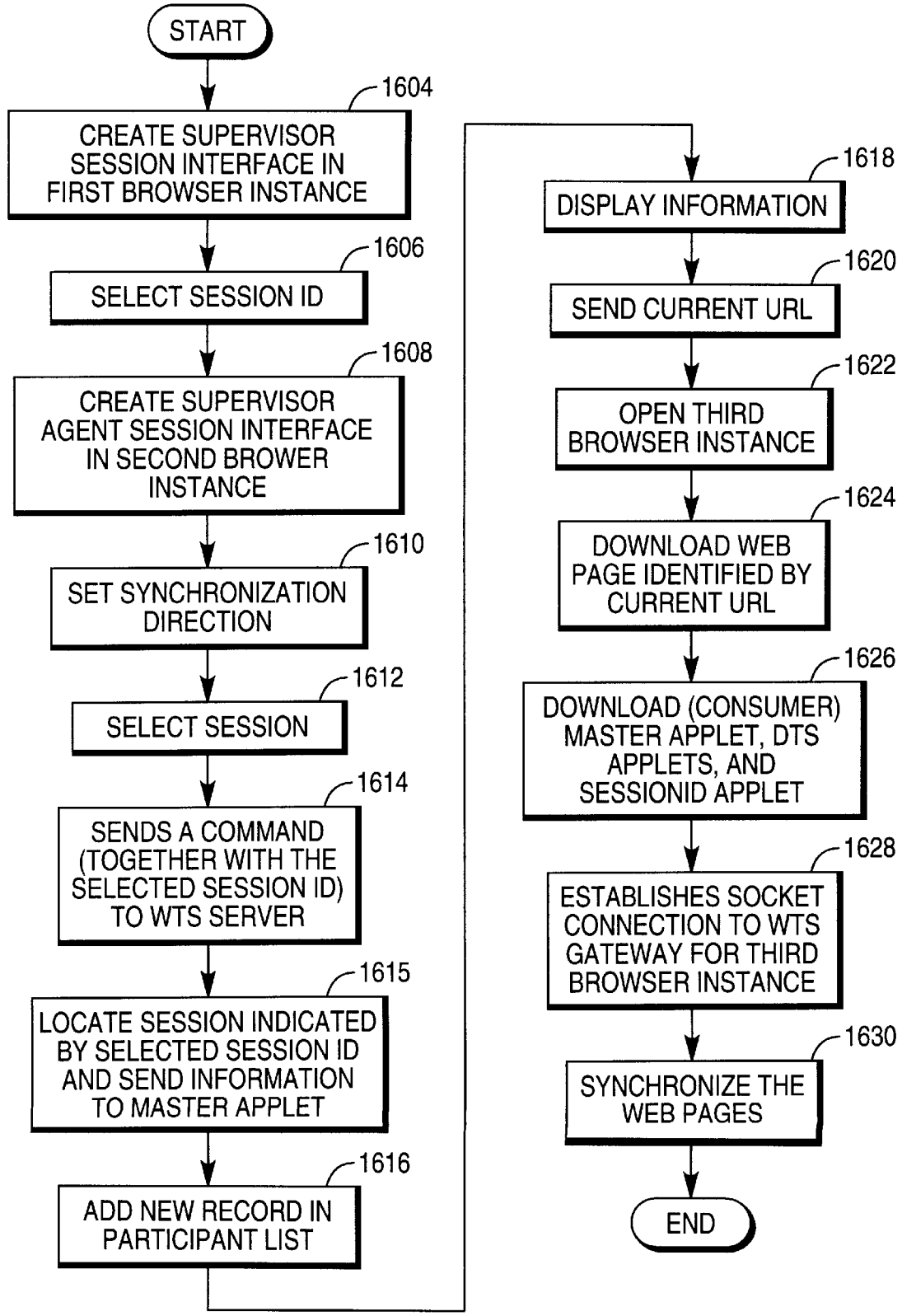
FIG. 16 shows a flowchart illustrating the operation of joining a session by a supervisor, in accordance with the present invention.

Referring to FIG. 16, there is shown a flowchart illustrating the operation of joining a session by a supervisor, in accordance with the present invention. In the example shown in FIG. 16, it is assumed that the supervisor is on duty at terminal 104K in a call center.

As shown in FIG. 16, at step 1604, the supervisor performs the steps shown in FIG. 7, where the supervisor downloads a supervisor page on which a (administration) Master Applet (referred as Master-Applet$_1$) and a Supervisor Applet are imbedded. The Supervisor Applet displays a supervisor session interface (as shown in FIG. 8B) in a first browser instance (see 800B in FIG. 17) on terminal 104K. Master-Applet$_1$ maintains a dedicated socket connection to WTS gateway 142 for the first browser instance (see 800B shown in FIG. 17).

At step 1606, from the first browser instance (see 800B shown in FIG. 17), the supervisor selects a session ID (listed in text box 832) and then select session button 838.

At step 1608, in response to the selection of the select session button 838, browser 114K downloads a supervisor agent page, on which a (administration) Master Applet (referred as Master-Applet$_2$) and an Agent Applet are embedded. The Agent Applet creates a supervisor agent session interface 800C (as shown in FIG. 8C) and displays it in a second browser instance (see 800C in FIG. 17) on terminal 104K. Master-Applet$_2$ opens and maintains a dedicated socket connection to WTS gateway 142 for the second browser instance (see supervisor agent session interface 800C shown in FIG. 17).

At step 1610, there can be two possible scenarios. A first scenario is that: an agent has joined the selected session to help the consumer, and the supervisor wants to join the selected session as a participant. Under this scenario, the supervisor simply selects join button 846, and leader and follower buttons 850 and 852 are both selected automatically. A second scenario is that: no agent has joined the session and the supervisor wants to join the session. Under this scenario, the supervisor joins the session just like an agent, by first selecting leader button 850 and/or follower button 852, and then join session button 846. In this example, it is assumed that a consumer at terminal 104A and an agent at terminal 104N have joined the session, and the supervisor wants to join the selected session.

At step 1612, the supervisor selects join session button 846.

At step 1614, via the socket connection for the second browser instance (see supervisor agent session interface 800C shown in FIG. 17), the Master-Applet$_2$ sends WTS server 144 a command together with the selected session ID for the selected session.

At step 1615, WTS server 144 locates the session indicated by the selected session ID, and sends information stored in participant list 1 and URL history list 1 (see FIG. 6) to Master-Applet$_2$.

At step 1616, WTS server 144 stores ParticipantID and ParticipantAddress into participant list 1 for browser 114K. At this step, participant list 1 includes three participant records (three rows) for browsers 114A, 114K, and 114N respectively.

At step 1618, Agent Applet at terminal 104K displays the information stored in participant list 1, and URL history list 1 in participant text box 856, and URL history text box 858 (see FIG. 8C) respectively.

At step 1620, WTS server 144 sends Master-Applet$_2$ the URL of the web page being currently displayed at terminals 104A and 104N.

Figure 17:
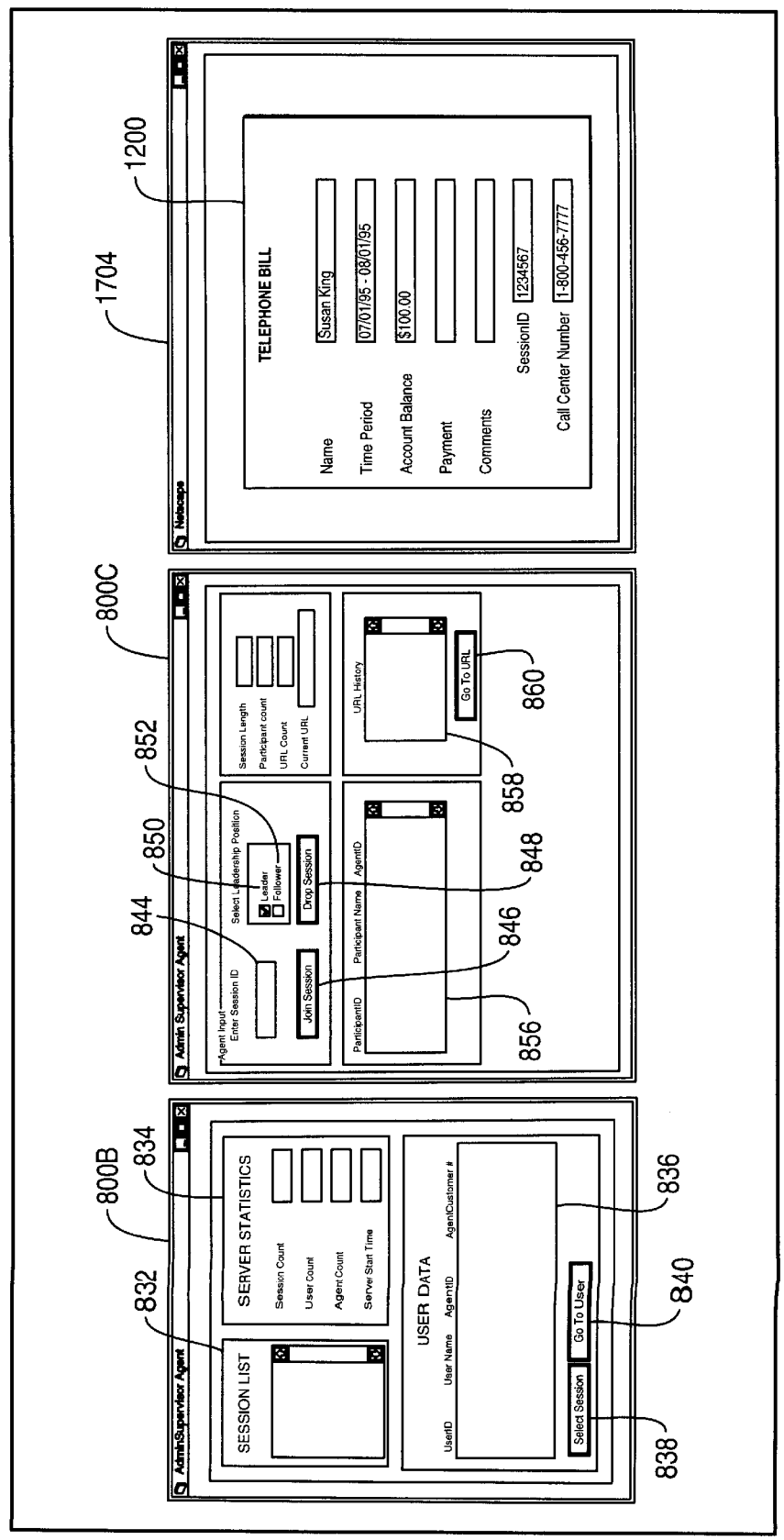
FIG. 17, there shows three browser instances for a supervisor, in accordance with the present invention.

At step 1622, the Agent Applet at terminal 104K opens a third browser instance (see 1704 in FIG. 17).

At step 1624, browser 114K downloads the web page identified by the URL from consumer page repository 146 (or loads the web page from memory area 115K in terminal 104K if it is cached there), and displays it in the third browser instance (see 1704 in FIG. 17).

At step 1626, browser 114K downloads (consumer) Master Applet 124K, DTS Applets 126K, and SessionID Applet 128 from consumer page repository 146 according to the applet tags in the current web page (assuming that these Applets have not previously downloaded).

At step 1628, Master Applet 124K opens a dedicated socket and establishes a socket connection to WTS gateway 142 for the third browser instance 1704 shown in FIG. 17.

After step 1630, the web pages displayed in third browser instance 1704 at terminal 104K are being synchronized with the web pages being displayed at terminals 104A and 104N.

Referring to FIG. 17, there is shown three browser instances (800B, 800C, and 1704) for the supervisor in response to the steps shown in FIG. 16, in accordance with the present invention.

Figure 18:
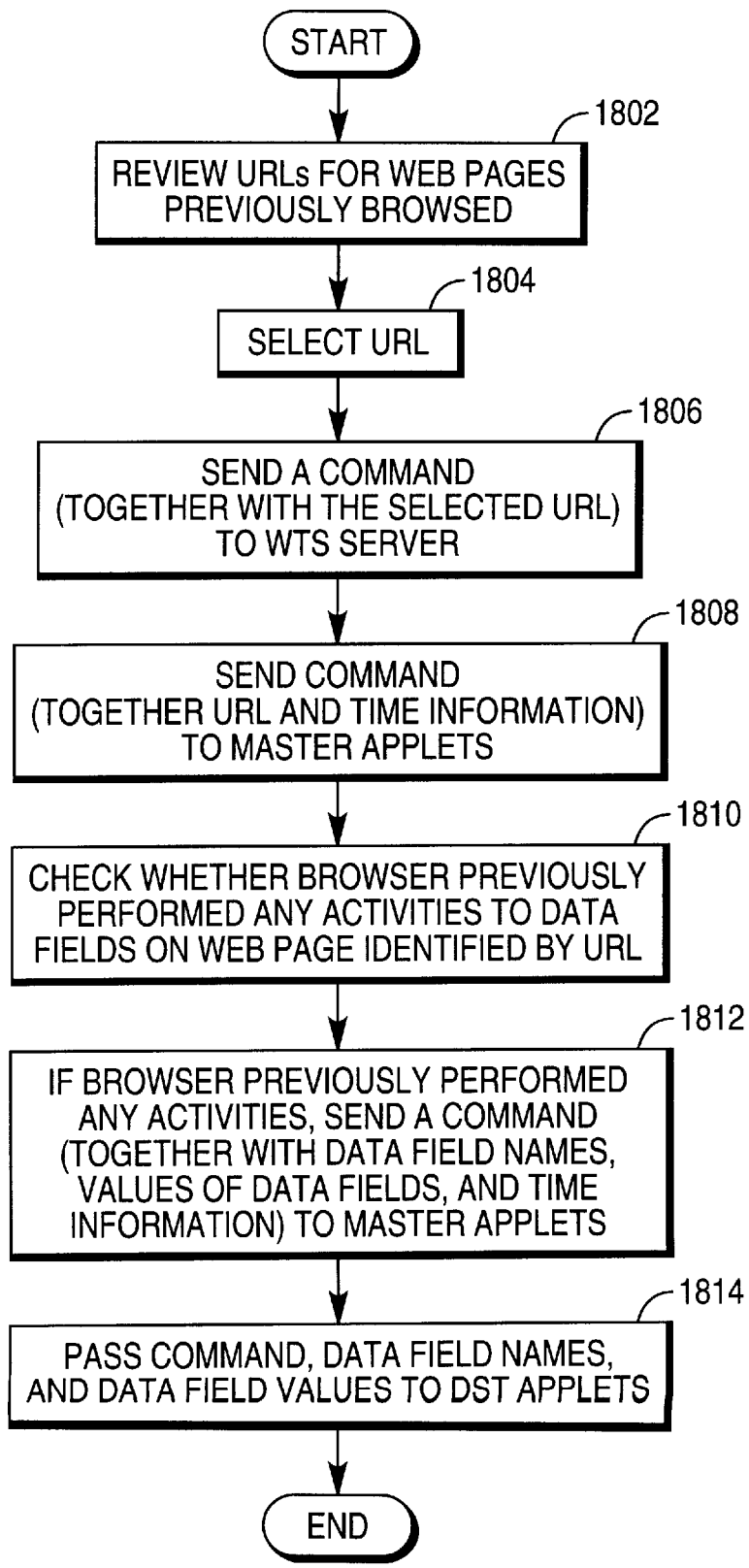
FIG. 18 shows a flowchart illustrating the operation of re-browsing a web page previously viewed in a session, in accordance with the present invention.

Referring to FIG. 18, there is shown a flowchart illustrating the operation of re-browsing a web page previously reviewed in a session, in accordance with the present invention.

In the example shown in FIG. 18, it is assumed that: (1) a consumer at terminal 104A is browsing web pages from consumer page repository 146 via browser 114A, (2) a session list 1 shown in FIG. 6 has been created for browser 114A, (3) an agent (or a supervisor) is on duty at terminal 104N in a call center, and agent class (or supervisor class) has been assigned to browser 104N, (4) at browser 114N, the first and second browser instances for the agent as shown in FIG. 10 (or the first, second and third browser instances for the supervisor as shown in FIG. 17) have been displayed, (5) via their respective socket connections established by their Master Applets, the first and second browser instances for the agent as shown in FIG. 10 (or the first, second and third browser instances for the supervisor as shown in FIG. 17) have been connected to WTS gateway 142, (6) Master Applets (124A and 124N), DTS Applets (126A and 126N) and SessionID Applets (128A and 128N) have been downloaded into terminals 104A and 104N respectively, (7) the agent (or supervisor) has selected and joined the session created for browser 114A, (8) at browser 114N, the second browser instance for the agent as shown in FIG. 10 (or the third browser instance for the supervisor as shown in FIG. 17) is being synchronized with browser 114A, and (9) bi-direction synchronization has been selected for browsers 114A and 114N.

At step 1802, for an agent user, via scrollable list box 818 on agent session interface shown in FIG. 10, he/she reviews the URLs for all the web pages previously browsed by browser 114A in the selected session. For a supervisor, via scrollable list box 858 on supervisor session interface shown in FIG. 17, he/she reviews the URLs for all the web pages previously browsed by browser 114A in the selected session.

At step 1804, to display an individual web page previously browsed by browser 114A, the agent (or supervisor) selects a URL from scrollable list box 818 (or scrollable list box 858) and double-clicks on it.

At step 1806, for the agent, the (agent) Master Applet or (the supervisor Master Applet) sends WTS server 144 a command together with the selected URL, via its respective socket connection.

At 1808, WTS server 144 sends a command together with the URL and the time information (loading and unloading) to Master Applets 124A and 124N, so that Master Applets 124A and 124N can inform their respective browsers 114A and 114N to load and display the web page based on the URL.

At 1810, WTS server 144 checks whether browser 114A previously performed any activities to data fields on the web page identified by the URL, based on the information stored in URL history list 1 and data list 1. As shown in FIG. 6, URL history 1 contains the information about: (a) participant ID of browser 114A, (b) the URL, and (c) the loading and unloading time of the web page identified by the URL. Data list 1 contains the information about: (a) data field names for data fields, (b) value of the data fields, and (c) the times at which values of the data fields were changed.

At step 1812, if browser 114 previously performed any activities to the data fields on the web page identified by the URL, WTS server 144 sends a command (together with the data field names, values of the data fields, and time information) to Master Applet 124A (at browser 114A) and Master Applet 124N (at browser 114N).

At step 1814, at browser 114A, Master Applet 124A passes the command, data field names, and data field values to DST Applets 126A, so that DTS Applets 124A can display the data field values into respective data fields on the web page being displayed. At browser 114N, Master Applet 124N passes the command, data field names, and data field values to DST Applets 126N, so that DTS Applets 124N can display the data field values into respective data fields on the web page being displayed.

Since the loading time and unloading time of the URL and the setting time for a data field are recorded in URL history list 1 and data list 1, if desired, the web page identified by the URL and the activities performed to the data fields can be duplicated (loading the web page, setting data fields on the web page, and unloading the web page) according to the time information.

Referring to FIG. 19, there is shown a flowchart illustrating the operation of re-browsing all web pages previously reviewed in a session, in accordance with the present invention.

In the example shown in FIG. 19, it is assumed that: (1) a consumer at terminal 104A is browsing web pages from consumer page repository 146 via browser 114A, (2) a session list 1 shown in FIG. 6 has been created for browser 114A, (3) an agent (or a supervisor) is on duty at terminal 104N in a call center, and agent class (or supervisor class) has been assigned to browser 104N, (4) at browser 114N, the first and second browser instances for the agent as shown in FIG. 10 (or the first, second and third browser instances for the supervisor as shown in FIG. 17) have been displayed, (5) via their respective socket connections established by their respective Master Applets, the first and second browser instances for the agent as shown in FIG. 10 (or the first, second and third browser instances for the supervisor as shown in FIG. 17) have been connected to WTS gateway 142, (6) Master Applets (124A and 124N), DTS Applets (126A and 126N) and SessionID Applets (128A and 128N) have been downloaded into terminals 104A and 104N respectively, (7) the agent (or supervisor) has selected and joined the session created for browser 114A, (8) at browser 114N, the second browser instance for the agent as shown in FIG. 10 (or the third browser instance for the supervisor as shown in FIG. 17) is being synchronized with browser 114A, and (9) bi-direction synchronization has been selected for browsers 114A and 114N.

At step 1902, for an agent user, via scrollable list box 818 on agent session interface shown in FIG. 10, he/she reviews the URLs for all the web pages previously browsed by browser 114A in the selected session. For a supervisor, via scrollable list box 858 on supervisor session interface shown in FIG. 17, he/she reviews the URLs for all the web pages previously browsed by browser 114A in the selected session.

At step 1904, to display all web pages previously browsed by browser 114A, the agent (or supervisor) selects Go to URLs button 820 in the agent session interface as shown in FIG. 10 (or Go to URLs button 860 in the supervisor session interface as shown in FIG. 17.

At step 1906, the (agent) Master Applet, or the (supervisor) Master Applet, sends a command to WTS server 144.

At 1908, WTS server 144 sequentially sends commands, together the URLs and time information, to Master Applets 124A and 124N, so that Master Applets 124A and 124N can inform their respective browsers 114A and 114N to load and display the web pages based on the URLs.

At 1910, for each one of URLs that are sent together with the commands, WTS server 144 checks whether browser 114A previously performed any activities to data fields on a web page identified by a respective URL, based on the information stored in URL history list 1 and data list 1.

At step 1912, if browser 114 previously performed any activities to the data fields on the web page identified by a respective URL, WTS server 144 sends a command (together with the data field names and values of the data fields) to Master Applets 124A (at browser 114A) and Master Applet 124N (at browser 114N).

At step 1914, at browser 114A, Master Applet 124A passes the command, data field names, and data field values to DST Applets 126A, so that DTS Applets 124A can display the data field values into respective data fields on the web page being currently displayed. At browser 114N, Master Applet 124N passes the command, data field names, and data field values to DST Applets 126N, so that DTS Applets 124N can display the data field values into respective data fields on the web page being currently displayed.

Since the loading time and unloading time of the URLs and the setting time for data fields are recorded in URL history list 1 and data list 1, if desired, all the web pages identified by the URLs and the activities performed to the data fields can be duplicated (loading the web page, setting data fields on the web page, and unloading the web page) according to the timing information.

It should be noted that, in the above-described embodiments, all the Applets (Master Applets, DTS Applets, SessionID Applets, and Agent Applet) embedded into web pages are written using Java. However, some or all of these Applets can be written using a browser script language, such as Java Script. More specifically, the codes for these Applets can be selectively written into web pages using the browser script language, instead of using applet tags to link these Applets. When a web browser downloads a web page containing the Applets written in browser script language, it stores these Applets into the memory area of the terminal on which the web browser is running, and then initializes and invokes them.

The present invention has the following advantages:

Dependable web page tracking and synchronizing—It tracks and synchronizes all user activities, even if web pages come from cached pages stored in browser cache or proxy servers.

Ease of use—It eliminates the current manual process of multiple users separately re-creating the web navigation.

Ease of execution (from users' point of view)—It does not require additional software to support the present invention. No software needs to be installed, configured, or run by a user.

Portability—It works across different operating systems at both client and server sides. On the client side, the requirement is that there be a web browser that supports Java Applets. On the server side, the requirement is that there be a Java Virtual Machine (JVM) on the same server that provides the HTTP service. Since there are JVMs practically for very operating system, the server components of the present invention have the potential to run on all the operating systems.

Compatibility—It works together with any HTTP servers from different vendors because the server components of the present invention requires no processing by HTTP servers, and thus are independent from HTTP servers.

Flexibility—Web page synchronization can be used independently in conjunction with web page tracking. Web page synchronization does not require persistent storage of any of the data tracked.

User privacy—It ensures a reasonable level of user privacy, since tracking and synchronization is limited to pages served by a web site that the information provider has control over.

Multiple HTTP server supported—It can handle the situation where a company has multiple physical servers running its web site, since the separation of the WTS gateway and server components enables a gateway to be placed on each HTTP server—each communicating with a common WTS server.

While the invention has been illustrated and described in detail in the drawing and foregoing description, it should be understood that the invention may be implemented through alternative embodiments within the spirit of the present invention. Thus, the scope of the invention is not intended to be limited to the illustration and description in this specification, but is to be defined by the appended claims.

What is claimed is:

1. A method of tracking changes at an administrative browser to a web page being displayed at a plurality of user browsers, the method comprising the steps of:

(a) retrieving the page at each of the plurality user browsers;
(b) at any one or more of the user browsers making at least one change to the retrieved web page;
(c) at the network site, recording the at least one change made any one or more of the user browsers; and
(d) at the administrative browser, displaying the at least one change recorded for at least one of the user browsers.

2. The method of claim 1, further comprising the step of: between the user browser and the administrative browser, synchronizing browser activities performed either at the user browser or the administrative browser.

3. The method of claim 1, comprising establishing a dedicated socket connection between each of the user browsers and the administrative browser.

4. The method of claim 3, comprising recognizing, at the administrative browser, which of the user browsers made a change to the web page.

5. The method of claim 3, wherein the establishing step is performed by an applet residing with the user browser.

6. The method of claim 1, comprising detecting that a change has been made to a web page and forwarding such change to the administrative browser.

7. The method of claim 1, comprising recording he URL and an update of a data field into a data list.

8. The method of claim 1, comprising maintaining a participant list of each of the users browser participating in a session wherein a session is a collection of web page interactions that occur over a given period of time from a specific browser.

9. The method of claim 8, comprising assigning a session ID to each of the plurality of user browsers.

10. The method of claim 9, comprising maintaining a session list including information about a session, a URL history list for maintaining information about all web pages visited by all participants in a session, a data list for maintaining information about the data fields visited by all participants in a session and a command list for maintaining all commands issued to the administrative server during a session.

11. The method of claim 1, wherein the changes are made to data fields on the web page.

12. The method of claim 1, comprising bi-directionally synchronizing the administrative browser and each of the user browsers.

13. The method of claim 1, comprising loading a master applet, a DTS applet and a session ID applet on to a computer on which each of the user browsers reside.

14. A method of tracking activities performed to web pages at a plurality of user browsers, the method comprising the steps of:

(a) retrieving at least one of the pages at each of the user browsers;
(b) at an administrative site, creating a plurality of sessions, with each of the sessions being associated with a respective one of the user browsers;
(c) at least one of the user browsers, performing activities to the retrieved pages;
(d) at the administrative site, recording the activities for each of the user browsers into an associated session; and
(e) using a web browser, displaying at least one session created for at least one of the user browsers.

15. The method of claim 14, comprising establishing a dedicated socket connection between each of the user browsers and the administrative browser.

16. The method of claim 15, comprising recognizing, at the administrative browser, which of the user browsers made a change to the web page.

17. The method of claim 16, wherein the establishing step is performed by an applet residing with the user browser.

18. The method of claim 14, comprising recording he URL and an update of a data field into a data list.

19. The method of claim 14, comprising maintaining a participant list of each of the users browser participating in a session wherein a session is a collection of web page interactions that occur over a given period of time from a specific browser.

20. The method of claim 19, comprising assigning a session ID to each of the plurality of user browsers.

21. The method of claim 20, comprising maintaining a session list including information about a session, a URL history list for maintaining information about all web pages visited by all participants in a session, a data list for maintaining information about the data fields visited by all participants in a session and a command list for maintaining all commands issued to the administrative server during a session.

22. The method of claim 14, comprising bi-directionally synchronizing the administrative browser and each of the user browsers.

23. The method of claim 14, comprising loading a master applet, a DTS applet and a session ID applet on to a computer on which each of the user browsers reside.

24. The method of claim 14, comprising detecting that a change has been made to a web page and forwarding such change to the administrative browser.

25. The method of claim 14, in step (c) said activities including: loading a page and unloading a page, and changing a data field on a page.

26. The method of claim 14, in step (c) said activities including: changing a data field on a page.

27. A method of synchronizing a plurality of user browsers and an administrative browser to display a web page, comprising:

(a) retrieving the web page at one of the plurality of user browses;

(b) initialize an applet at the one user browser;

(c) establish a socket connection between the one user browser and the administrative browser;

(d) identify a session and forward session information from the one user browser to the administrative browser; and (e) store session information.

28. The method of claim 27, comprising locating a session list and a URL history list.

29. The method of claim 28, comprising issuing a time stamp and storing the time stamp in the URL history list.

* * * * *